Feb. 26, 1952   G. C. HENRY   2,587,316
ARTICLE SUPPORT AND THE LIKE
Filed Aug. 15, 1946   20 Sheets-Sheet 1
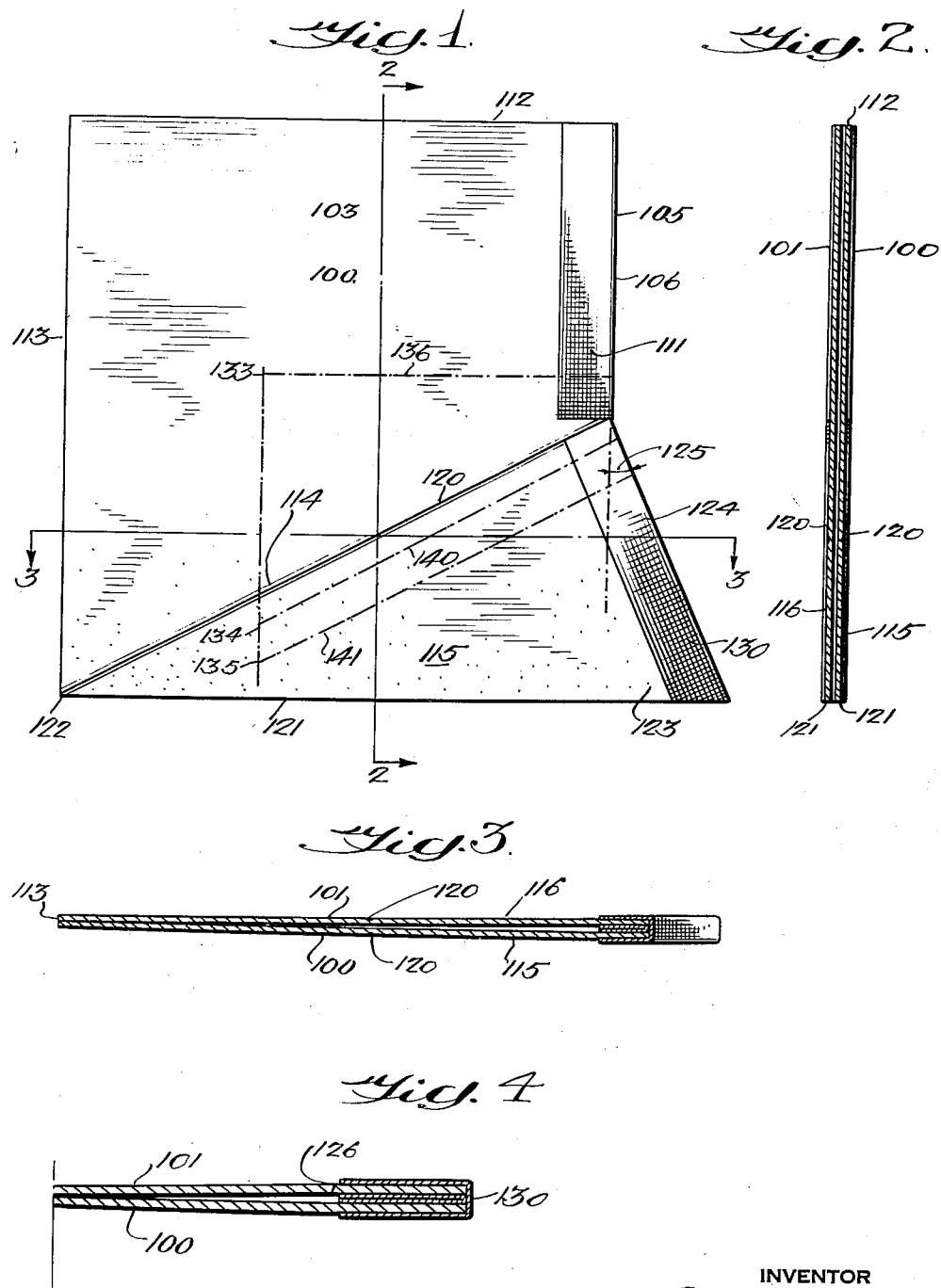
INVENTOR
Glenn C. Henry.
BY
ATTORNEY

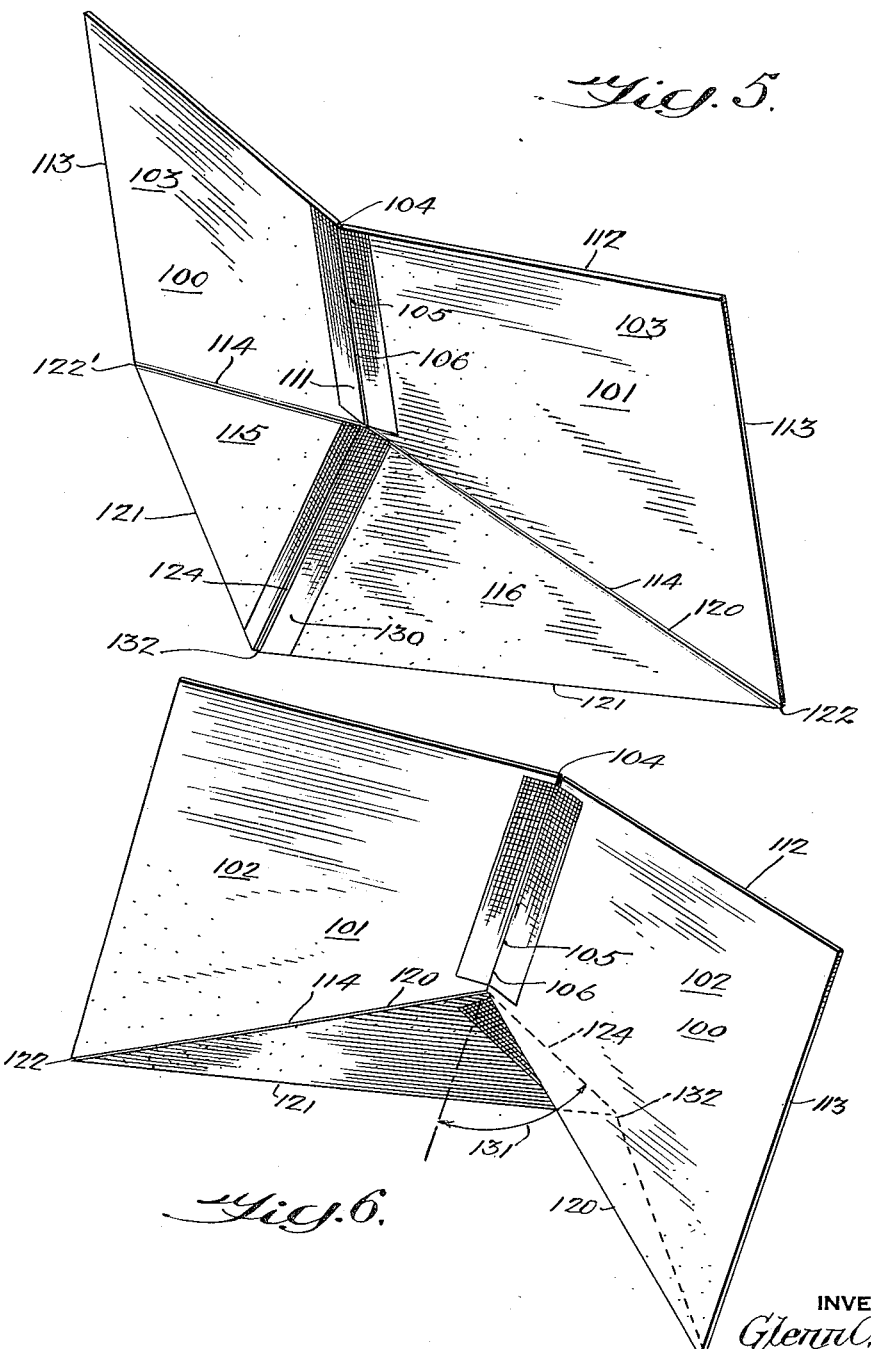

Feb. 26, 1952     G. C. HENRY     2,587,316
ARTICLE SUPPORT AND THE LIKE
Filed Aug. 15, 1946     20 Sheets-Sheet 5
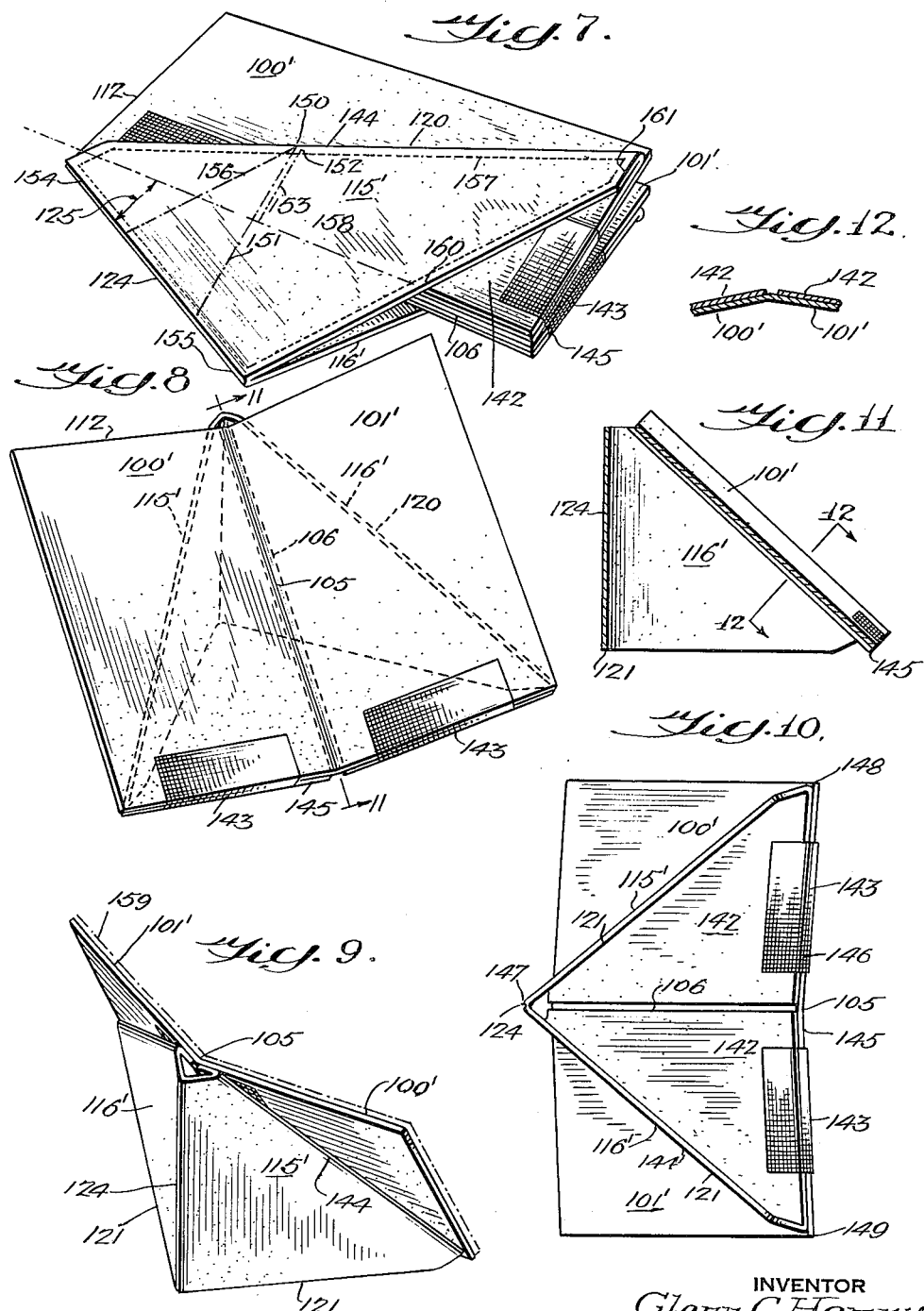

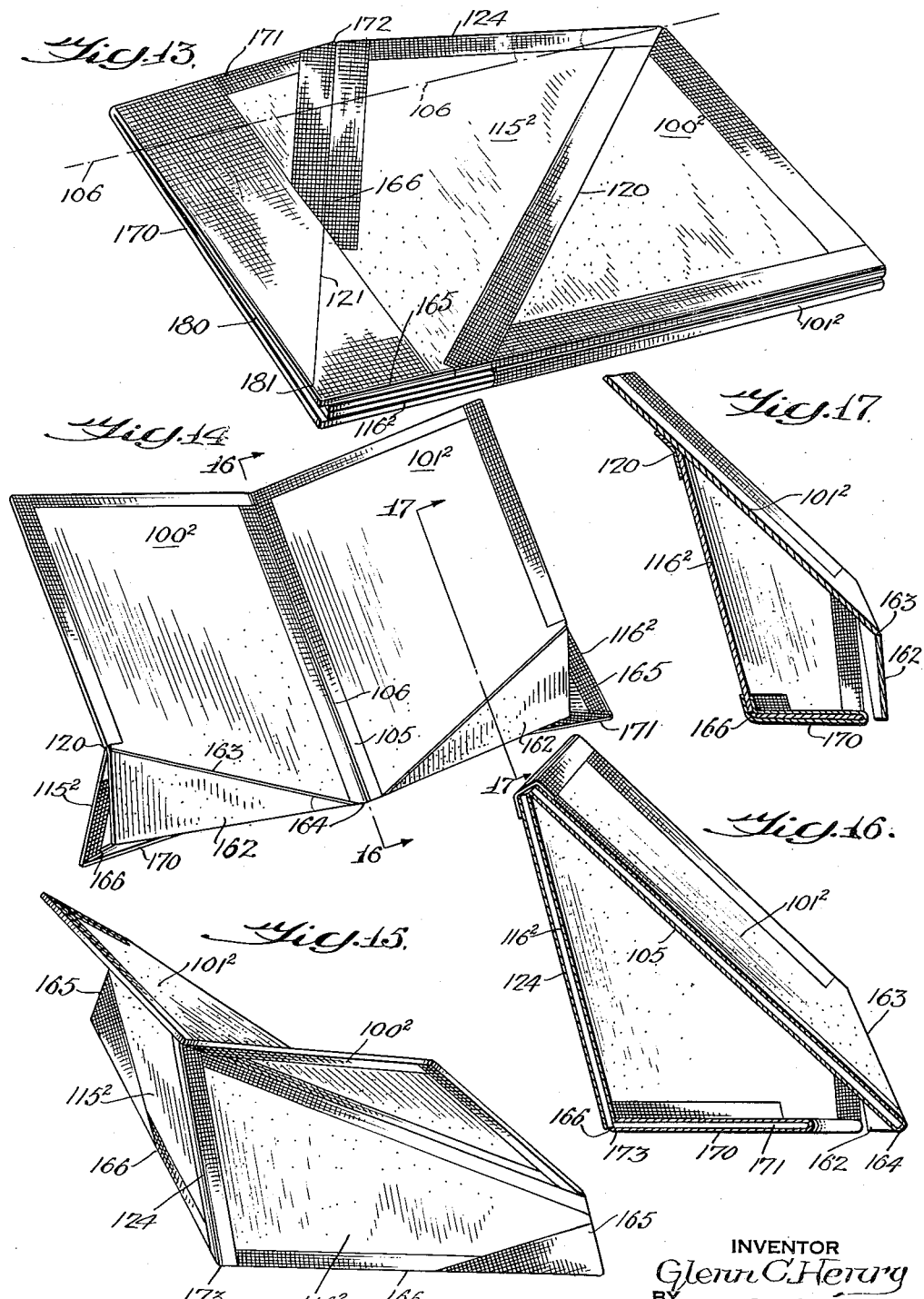

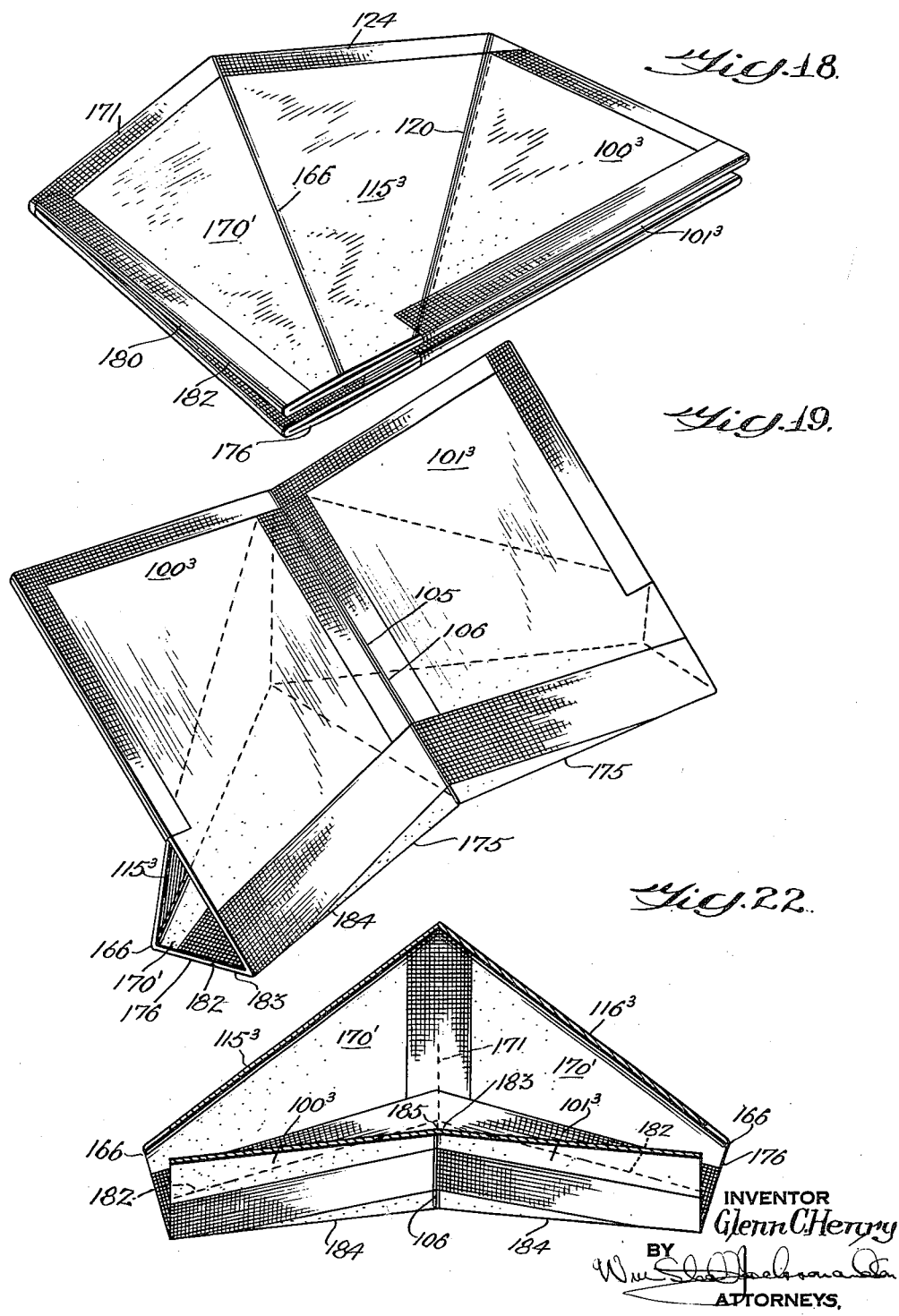

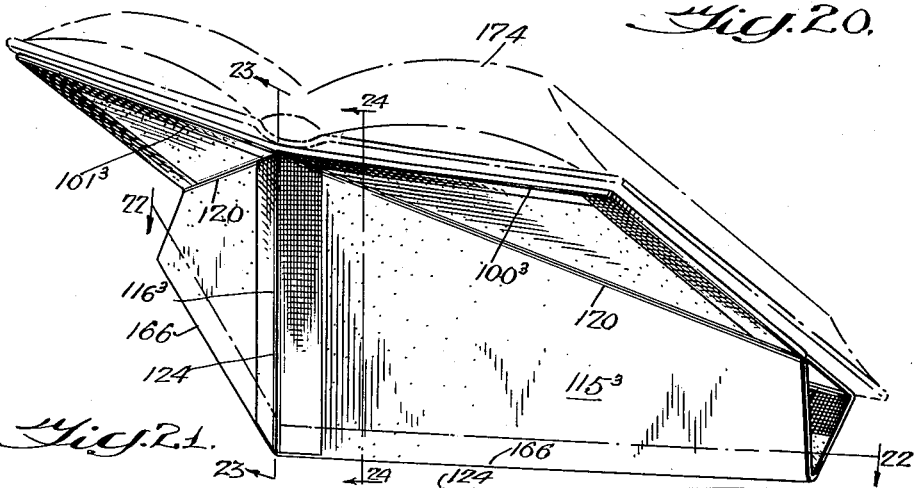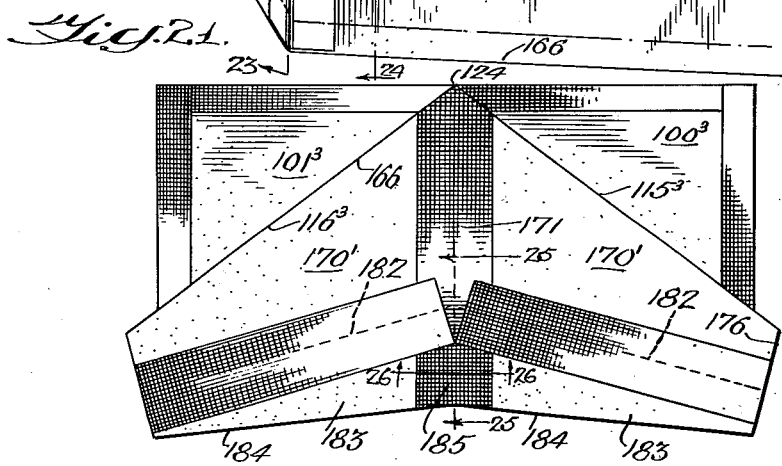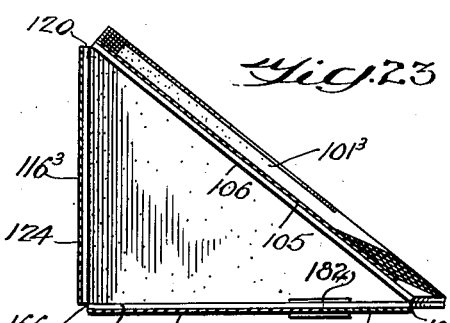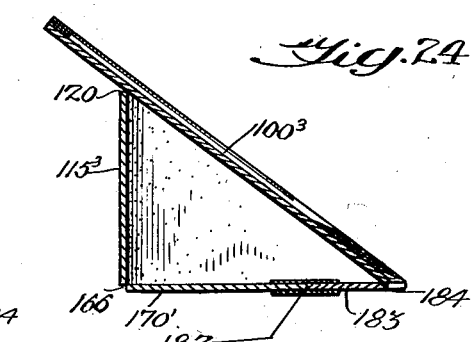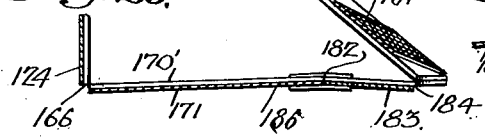

Feb. 26, 1952          G. C. HENRY          2,587,316
ARTICLE SUPPORT AND THE LIKE
Filed Aug. 15, 1946          20 Sheets-Sheet 7
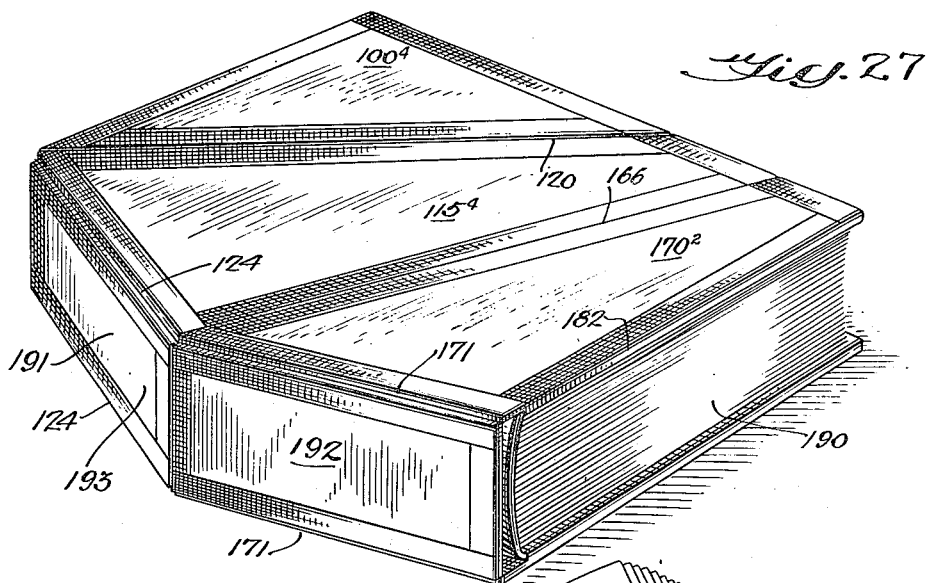
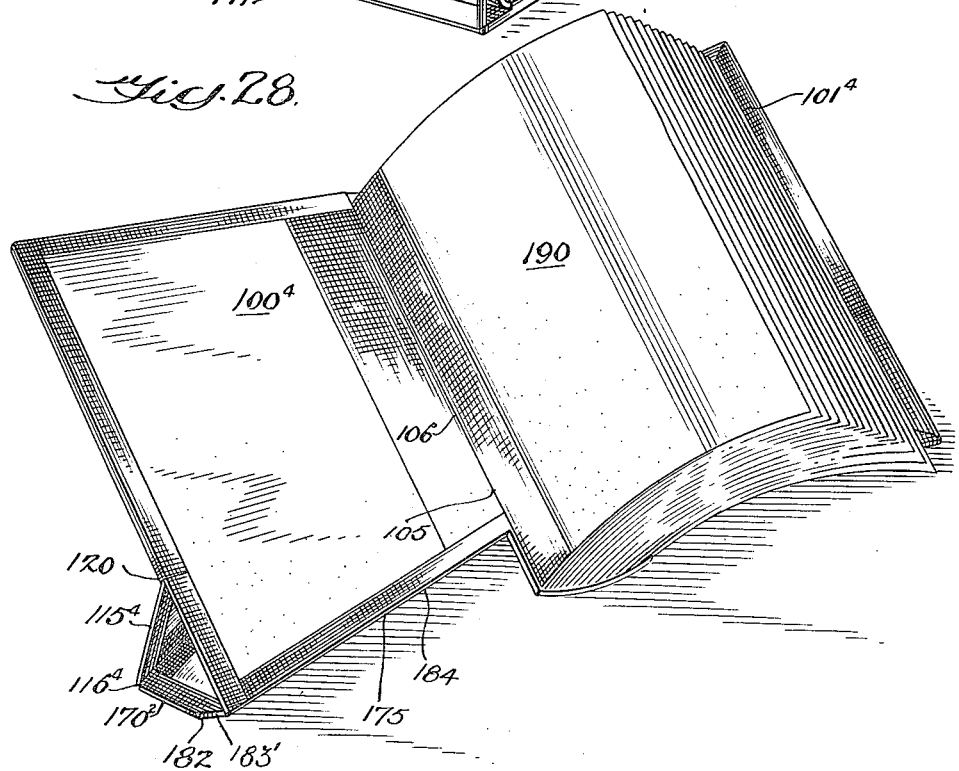
INVENTOR
Glenn C. Henry.
BY
ATTORNEYS,

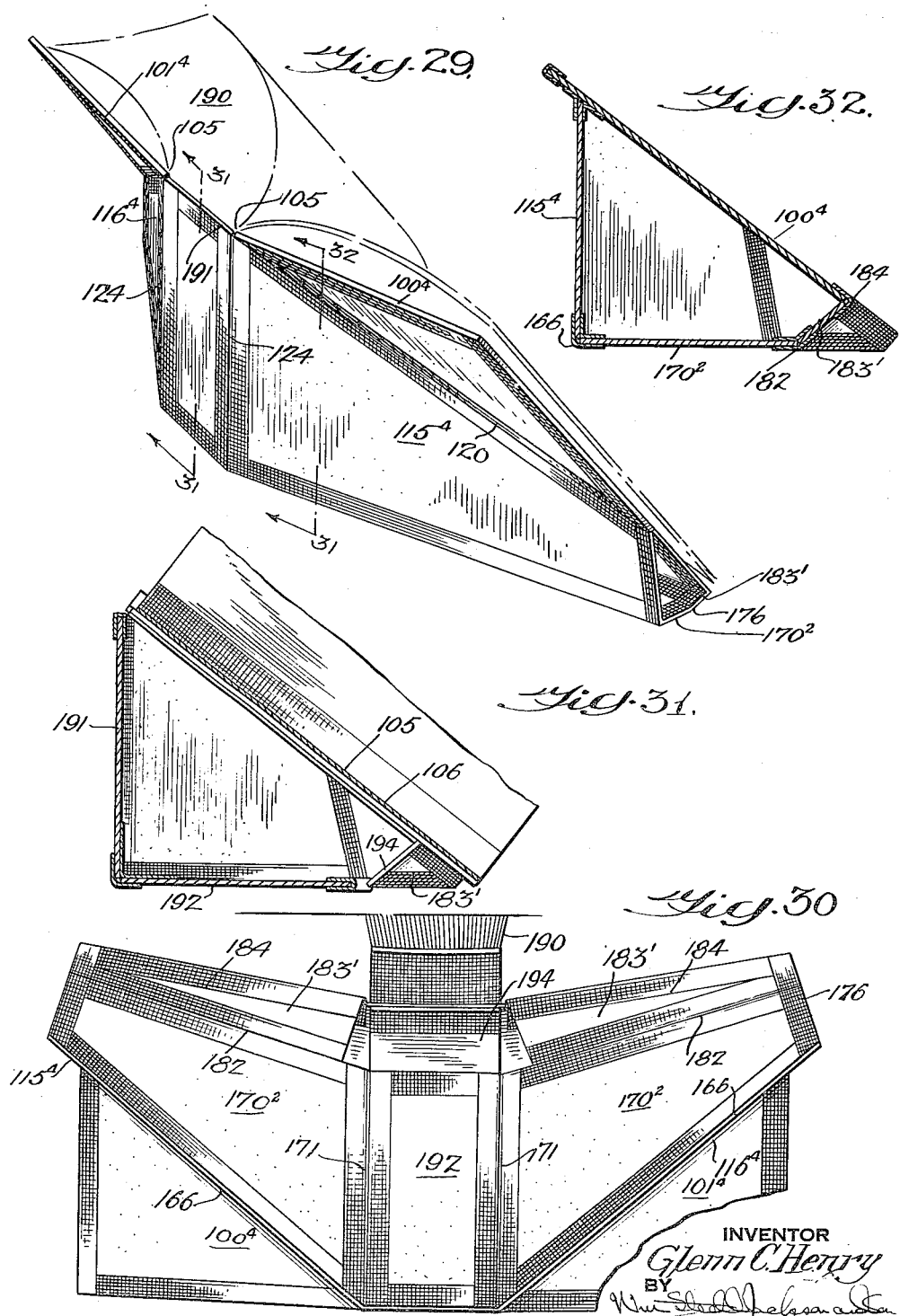

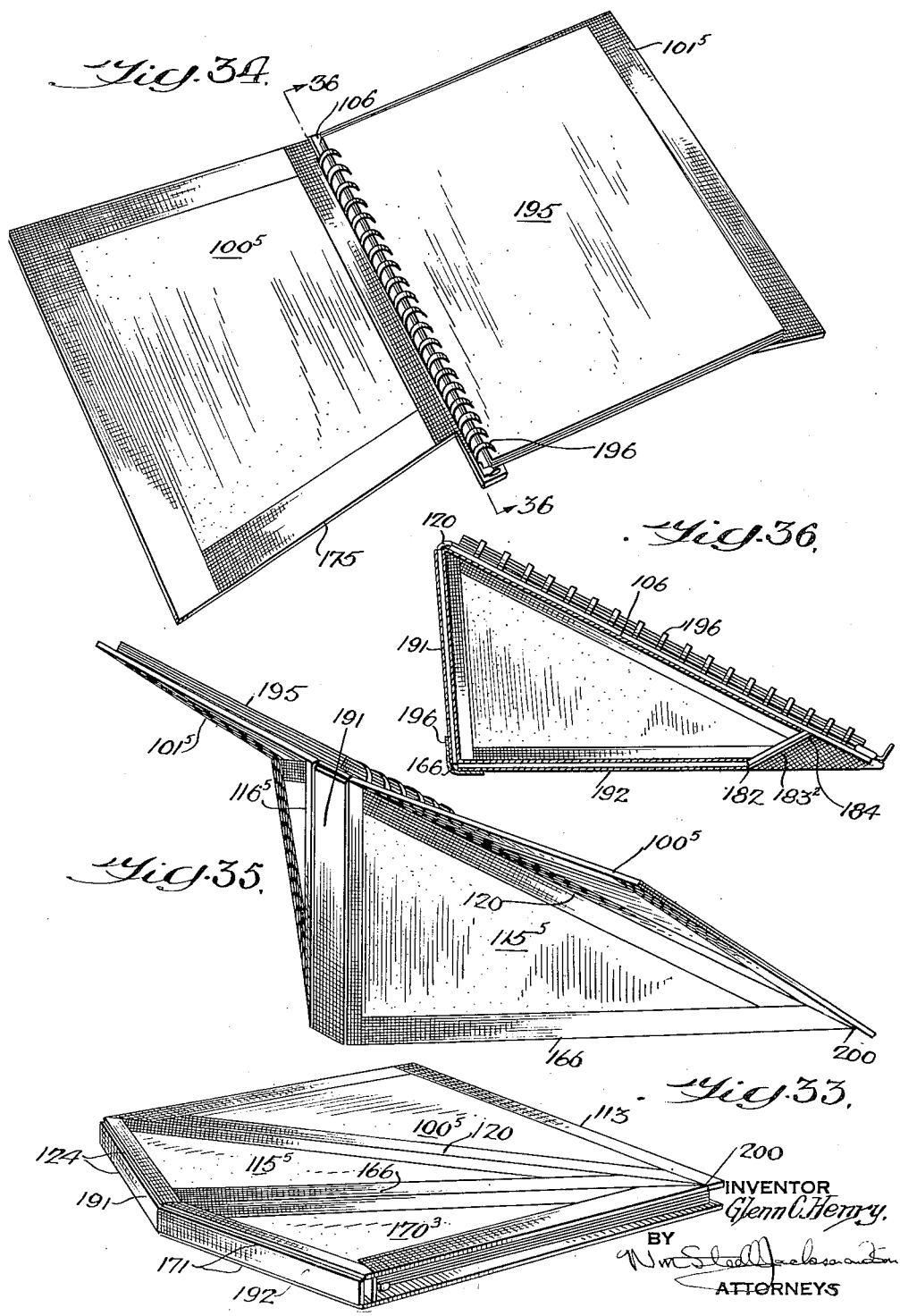

Feb. 26, 1952 G. C. HENRY 2,587,316
ARTICLE SUPPORT AND THE LIKE
Filed Aug. 15, 1946 20 Sheets-Sheet 10
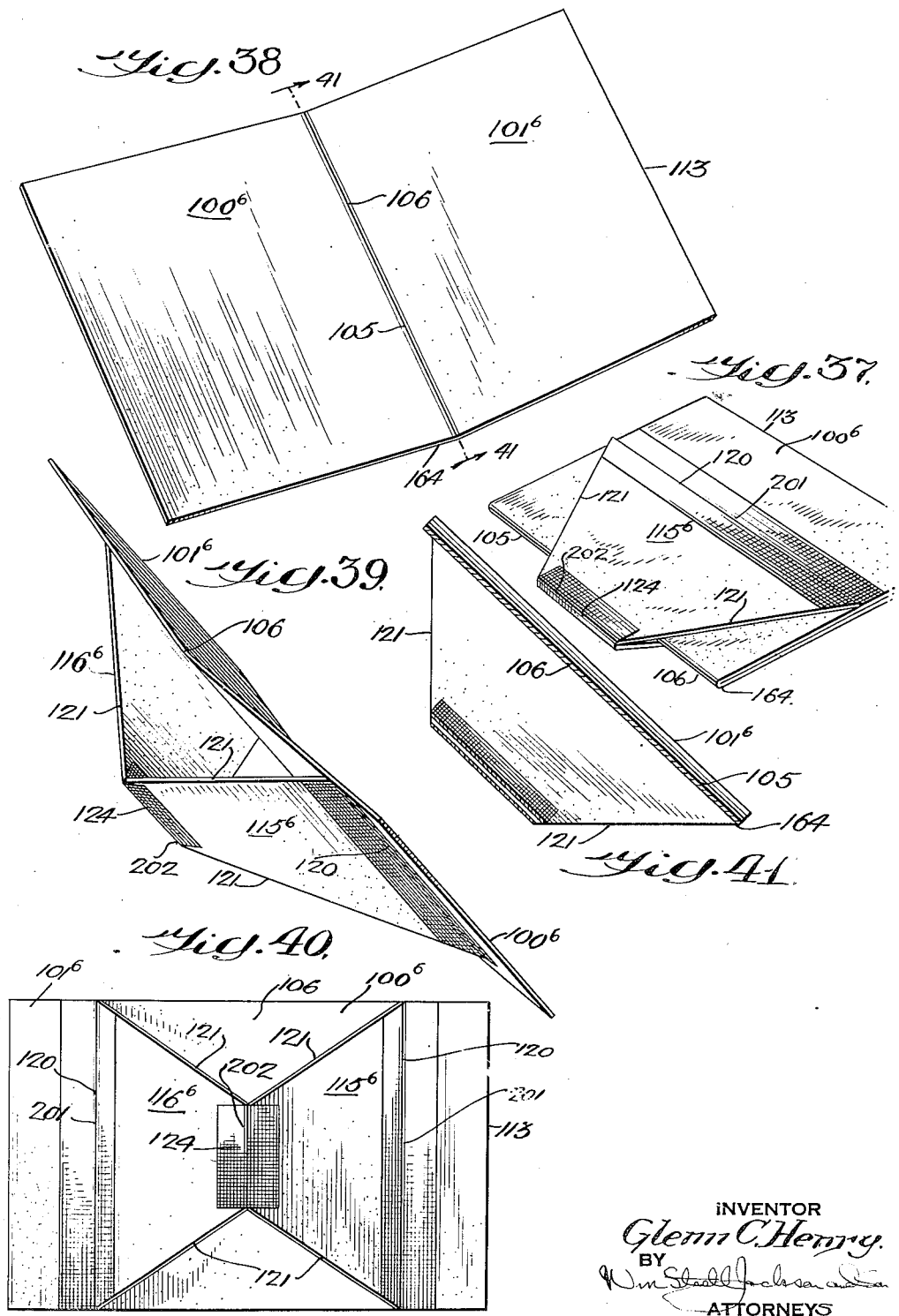
INVENTOR
Glenn C. Henry
BY
ATTORNEYS Feb. 26, 1952 G. C. HENRY 2,587,316
ARTICLE SUPPORT AND THE LIKE
Filed Aug. 15, 1946 20 Sheets-Sheet 11
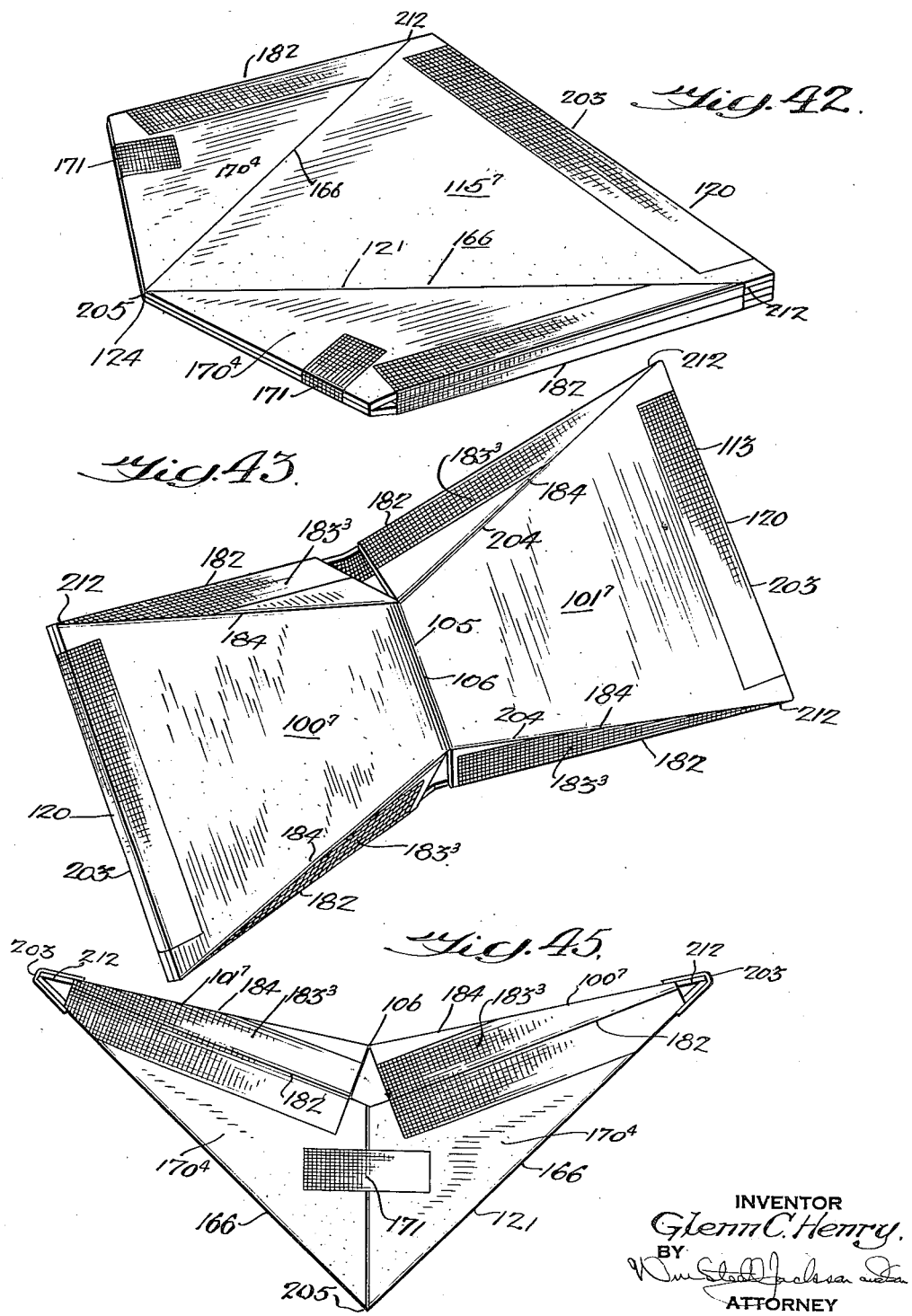
INVENTOR
Glenn C. Henry.
BY
ATTORNEY

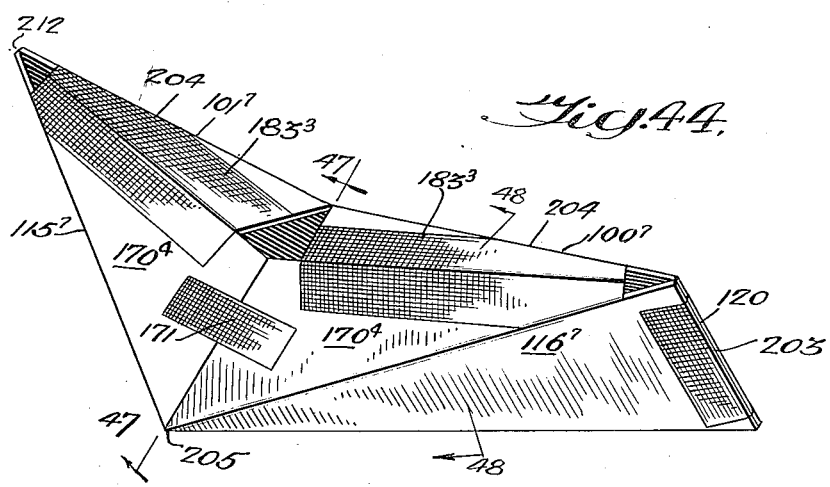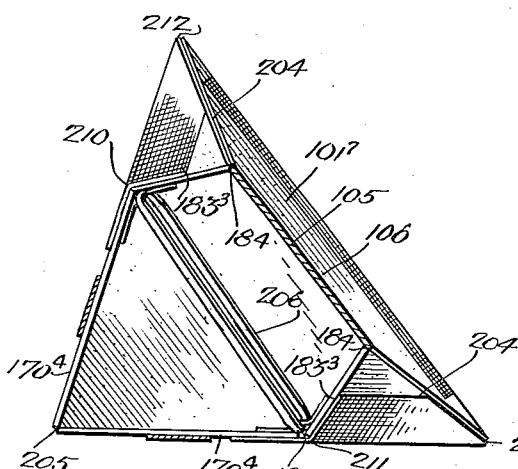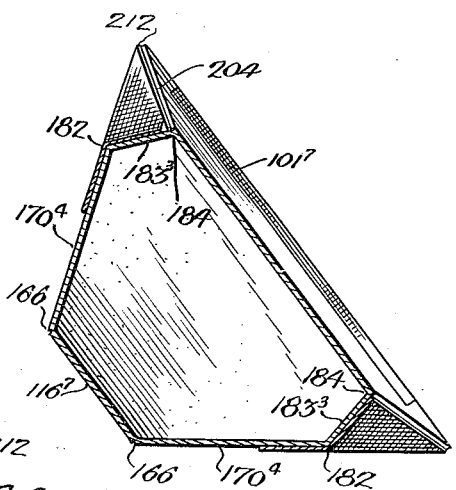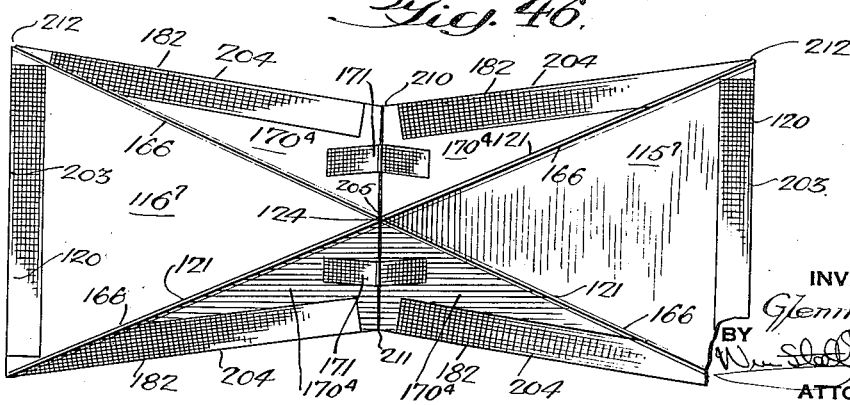

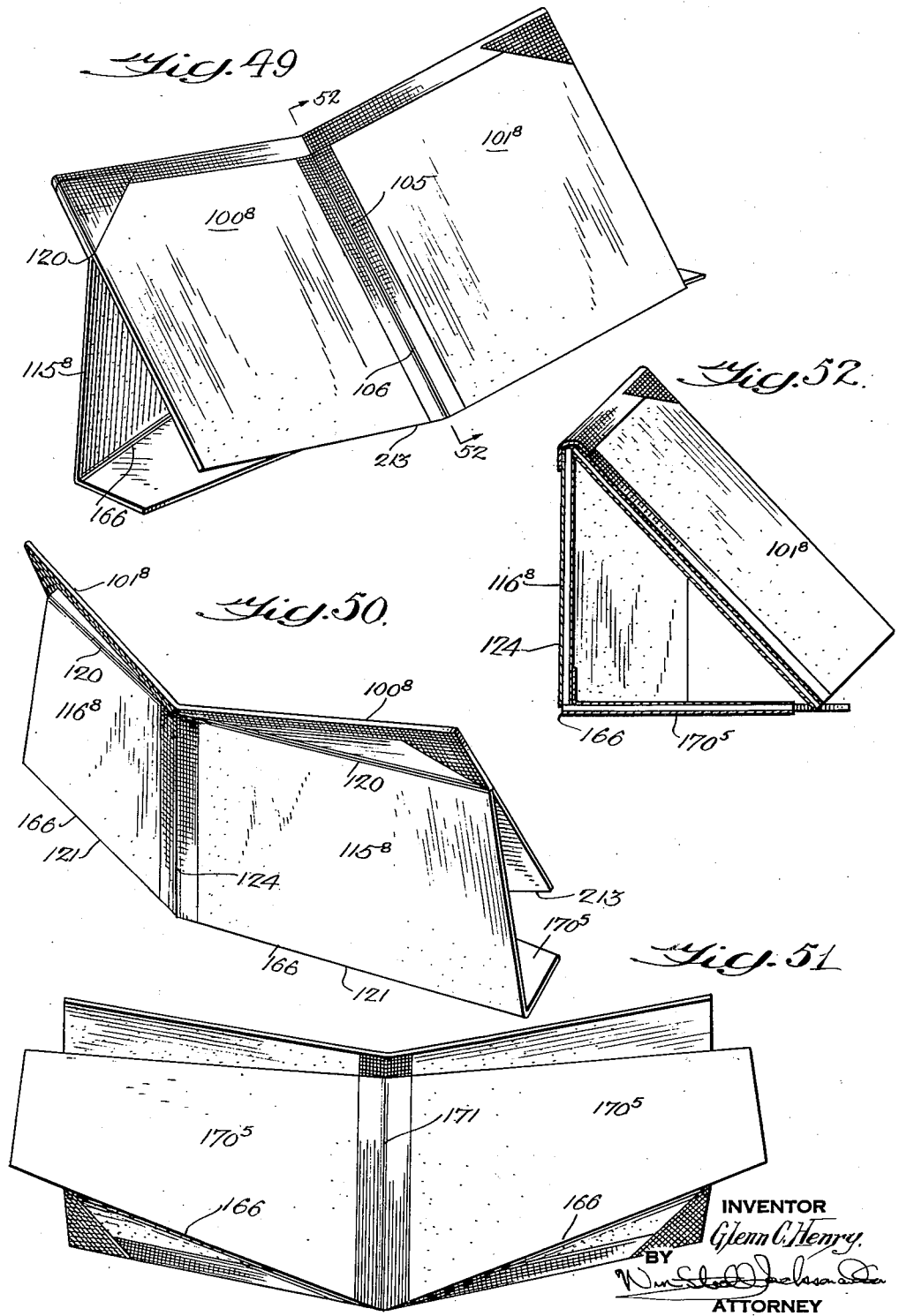

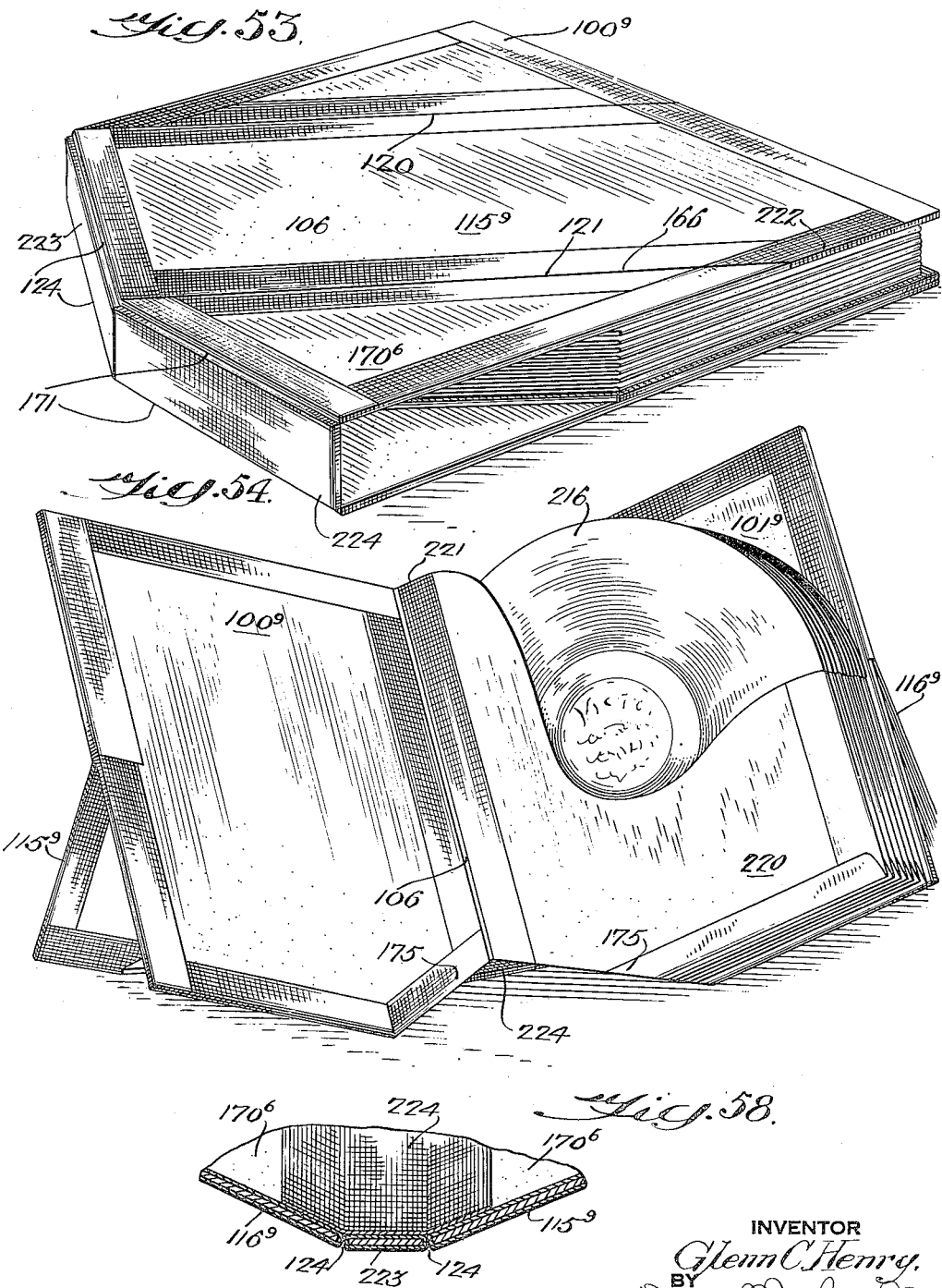

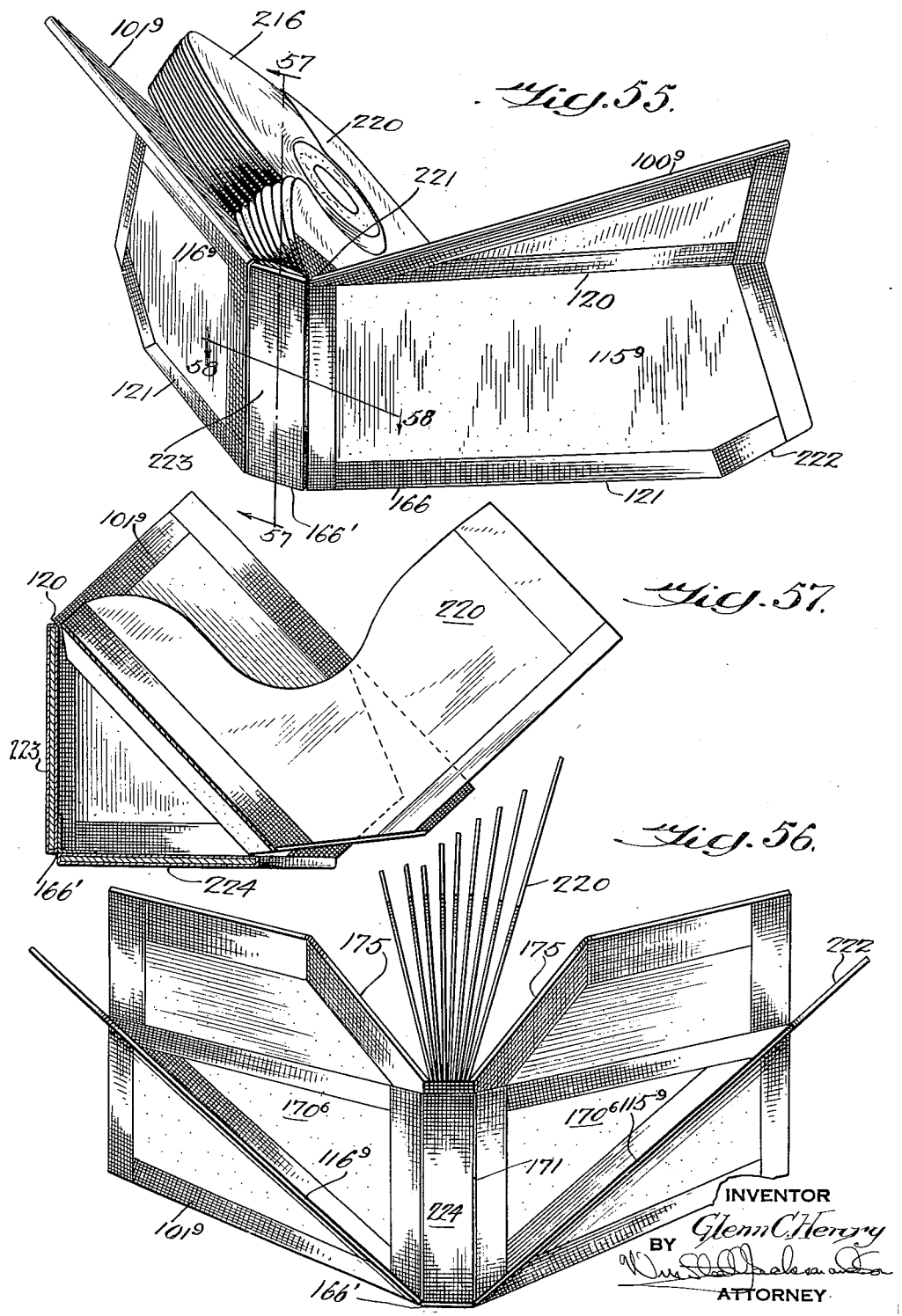

Feb. 26, 1952 — G. C. HENRY — 2,587,316
ARTICLE SUPPORT AND THE LIKE
Filed Aug. 15, 1946 — 20 Sheets-Sheet 16
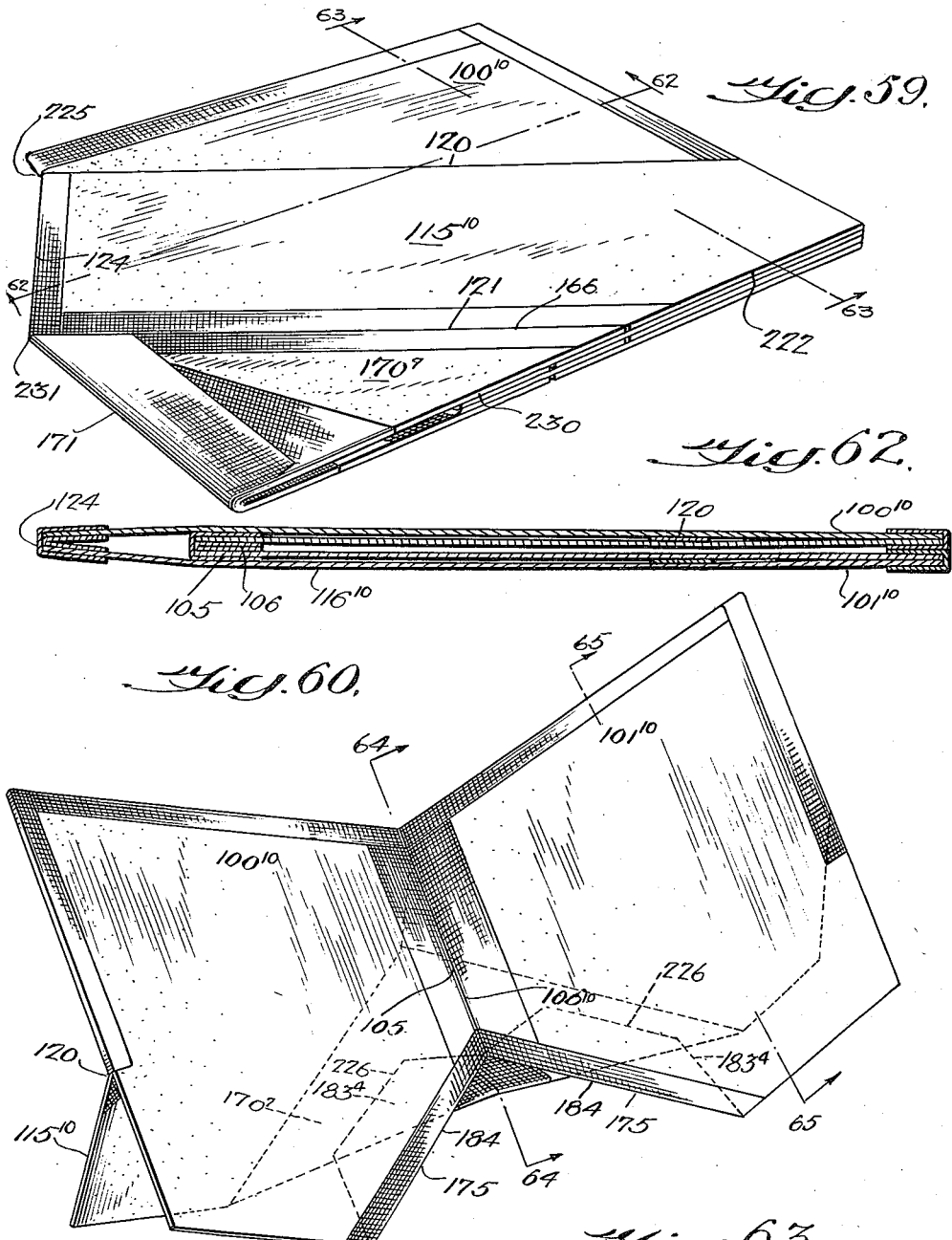

Feb. 26, 1952  G. C. HENRY  2,587,316
ARTICLE SUPPORT AND THE LIKE
Filed Aug. 15, 1946  20 Sheets-Sheet 17
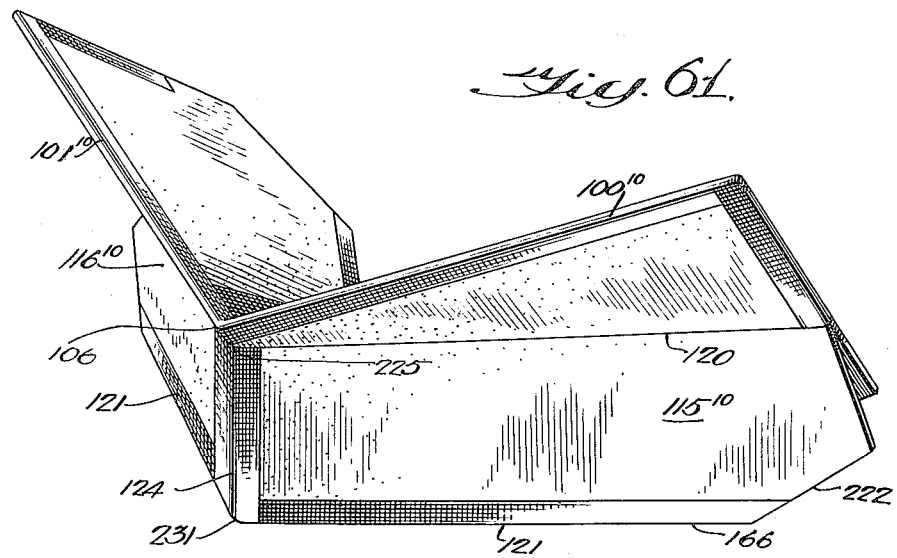
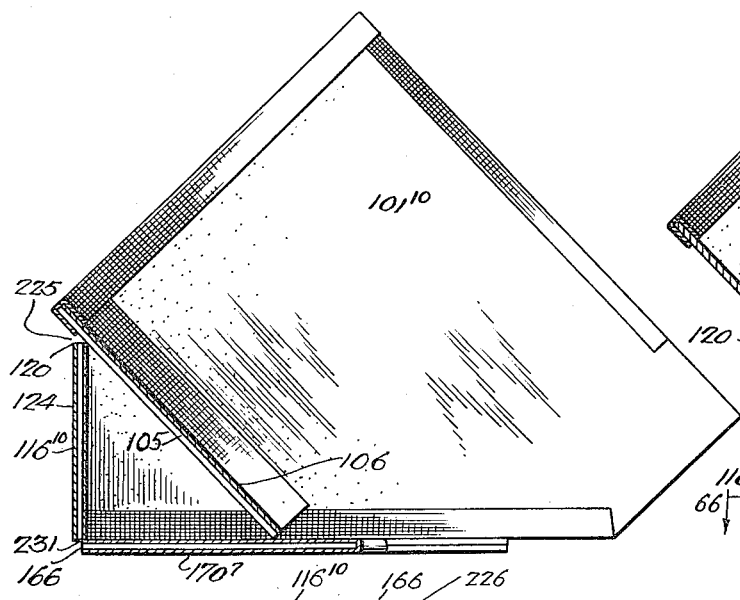
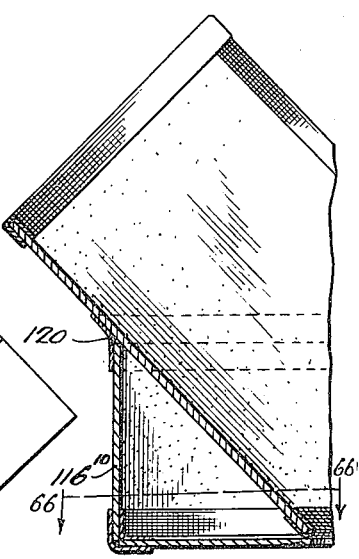
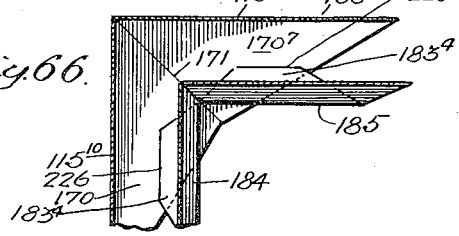
INVENTOR
Glenn C. Henry
BY
ATTORNEY

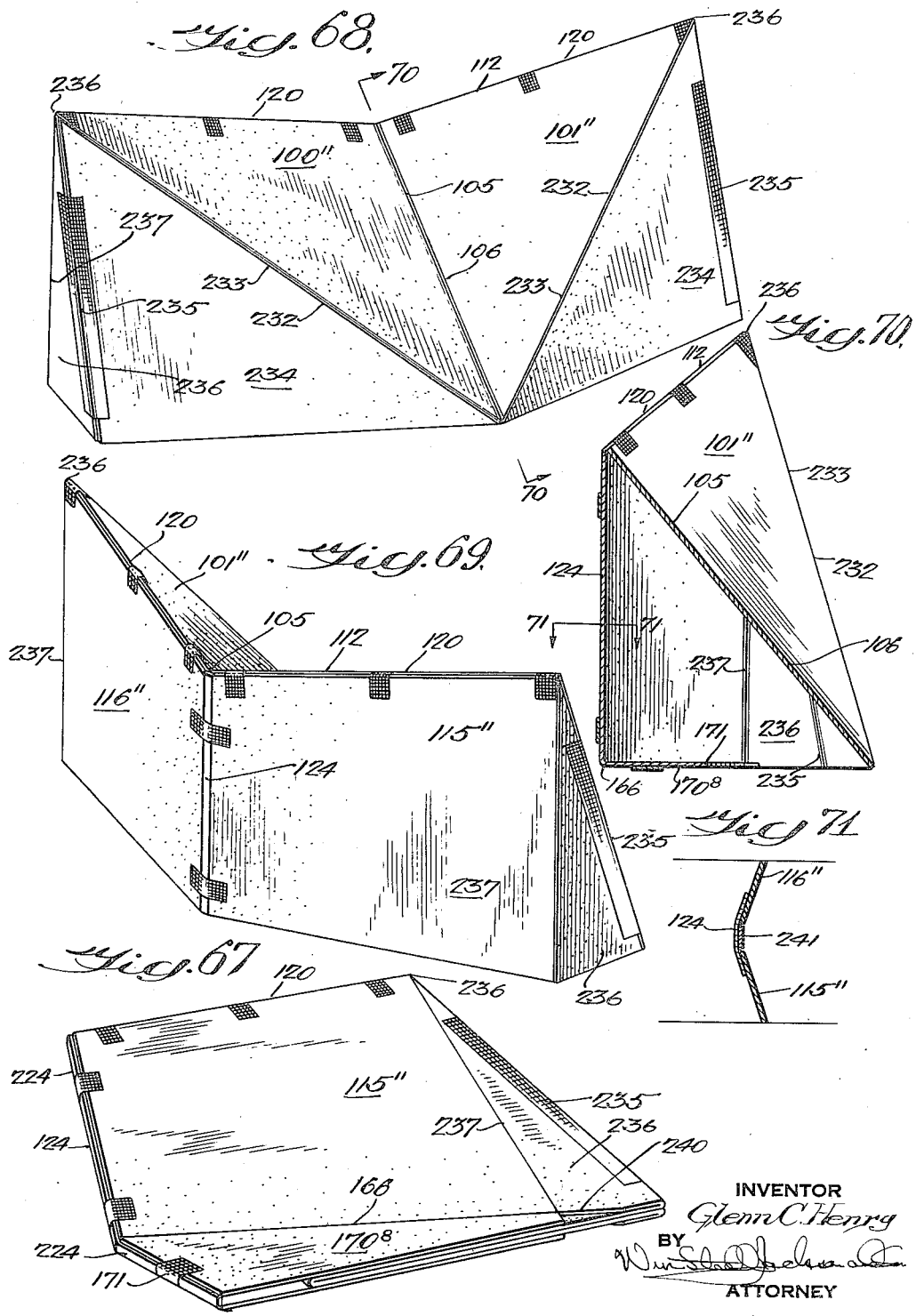

Feb. 26, 1952 — G. C. HENRY — 2,587,316
ARTICLE SUPPORT AND THE LIKE
Filed Aug. 15, 1946 — 20 Sheets-Sheet 19
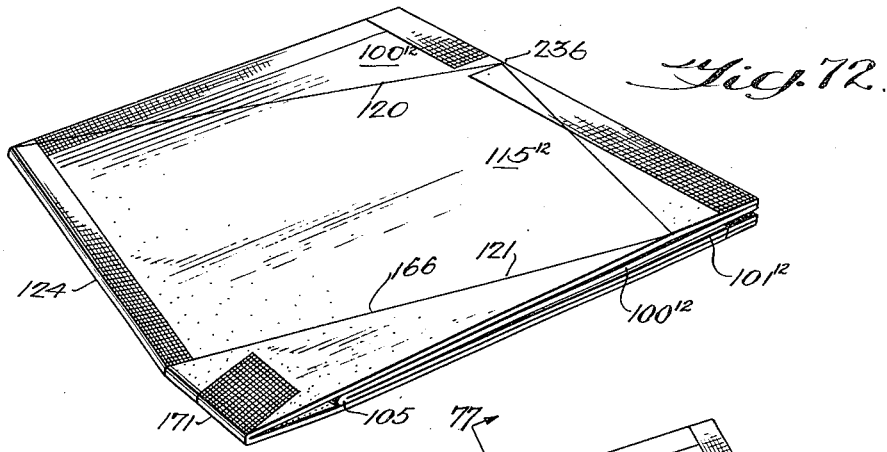
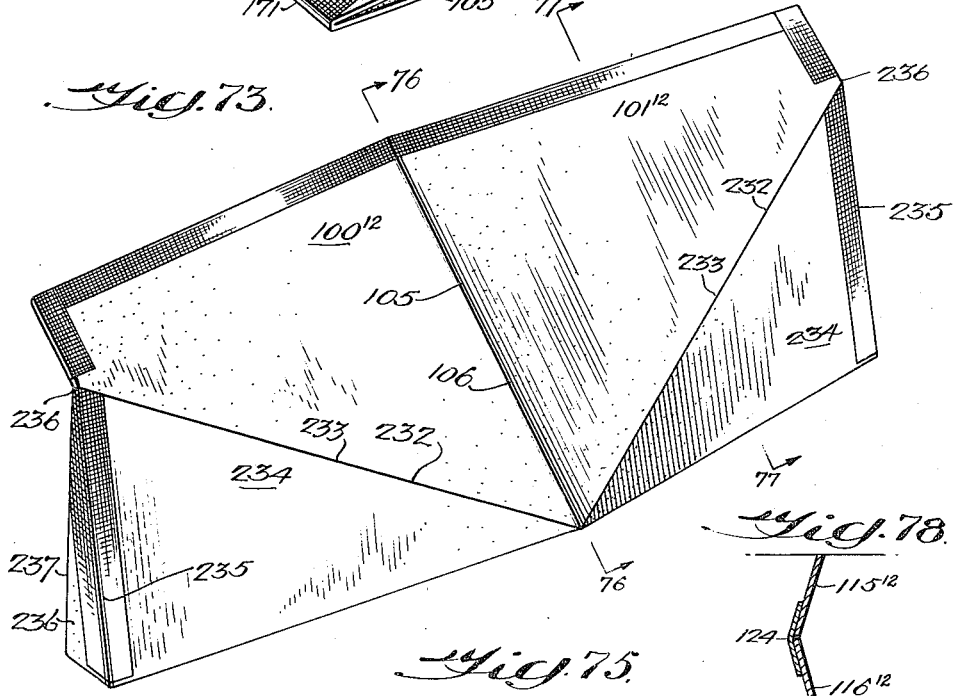
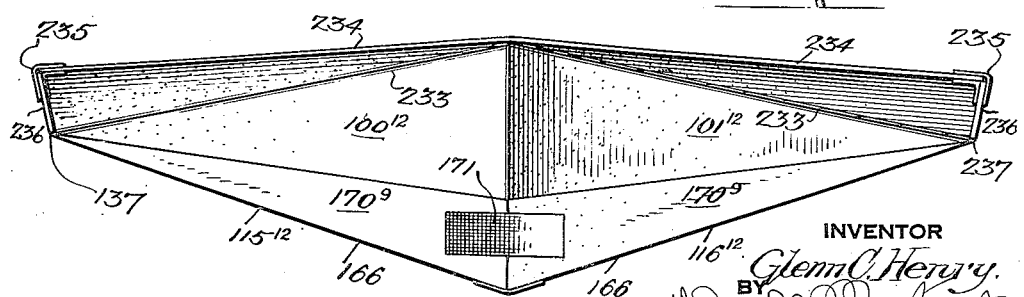
INVENTOR
Glenn C. Henry
BY
ATTORNEY

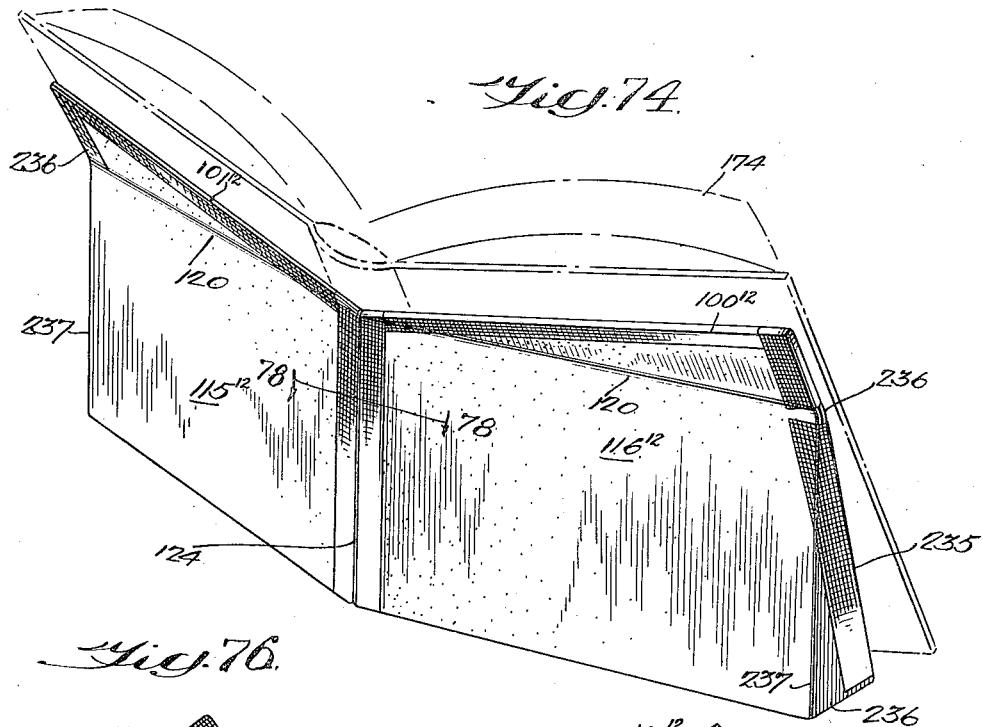
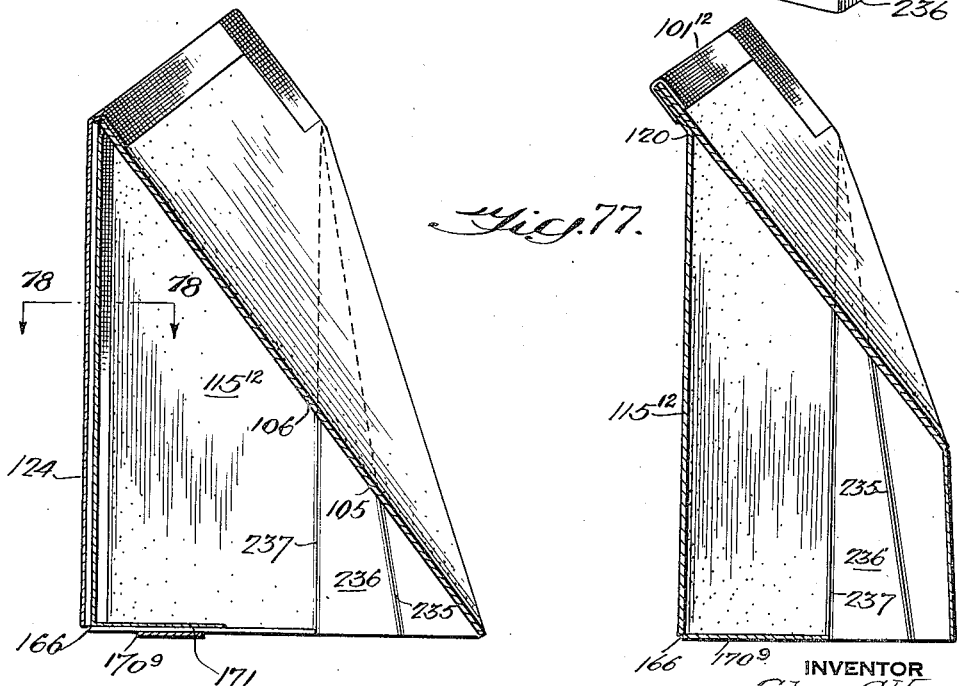
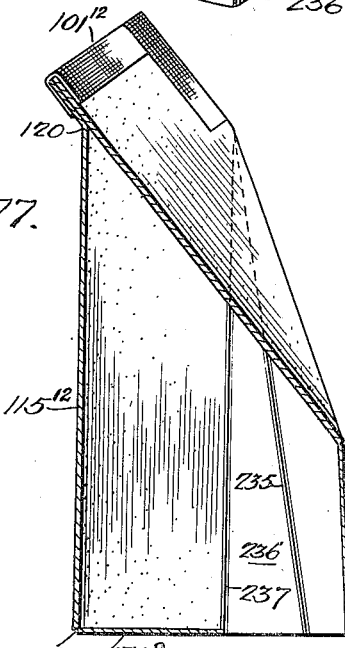

Patented Feb. 26, 1952

2,587,316

UNITED STATES PATENT OFFICE 2,587,316

ARTICLE SUPPORT AND THE LIKE

Glenn C. Henry, Moorestown, N. J.

Application August 15, 1946, Serial No. 690,812

23 Claims. (Cl. 248—35)

My invention relates to article supports of the type which may be used for supporting, or which may form part of, books, albums, cards, files or the like, or which may be employed generally as easels.

A purpose of my invention is to erect supports automatically and positively by opening hinged operators such as covers.

A further purpose is to hingedly connect supports, suitably of stiff sheet material, to operators such as covers and to one another in such manner that the structure has a substantially flat position in which the supports lie in planes adjacent to the planes of the covers, permissibly in the planes of the covers, and an erected position in which the supports diverge to a supporting position from the covers under positive lever action.

A further purpose is to hingedly connect the supports to one another on a line which is spaced over part of its length and preferably diverges from the line of the cover hinge in closed position and preferably forms an acute angle therewith, and which is further spaced and preferably further diverges therefrom in open position.

A further purpose is to provide by the structure lever elements preferably in the supports themselves having longer lever elements than corresponding lever elements in the covers, said lever elements forming a four bar linkage with two longer lever elements and two shorter lever elements.

A further purpose is to provide four cooperating members hingedly interconnected to one another, in closed position lying against one another in pairs, in open position forming a four-sided pyramid of support, hingedly connected along diagonal edges of the pyramid and having a limiting position, when two sides are open far enough, in which a three-sided pyramid of support is formed with two members lying in the same plane.

A further purpose is to open the covers into substantially the same plane and in that position form between the covers and the support a triangular pyramid of support in which the covers lying in substantially the same plane form one side of the pyramid.

The following statements of invention relate to species.

A further purpose is to provide diagonal edges on the covers, preferably at the bottom, which cooperate with supports in open position to support the structure at an angle.

A further purpose is to hingedly connect the supports to the covers on lines either converging or parallel with the lines of the supporting edges of the supports.

A further purpose is to limit the opening movement of the supports in response to the leverage applied by the operators or covers.

A further purpose is to hingedly connect four members along four hinge lines, and to manipulate the members positively from a compact flattened closed position in which the members lie in substantially parallel planes to an elected position in which two of the members formerly in parallel planes move to substantially the same plane and provide the third side of a three-sided pyramid of support.

A further purpose is to provide limiters or base flaps hingedly connected to the supports along their supporting edges, hingedly connected to one another and preferably by their angularity limiting the extent of opening movement of the operators or covers.

A further purpose is to hingedly connect the limiters or base flaps to one another along a line which in closed position forms an acute angle with the line of the cover hinge in an opposite direction from the acute angle formed by the hinge connection between the supports.

A further purpose is to provide auxiliary supports or tie flaps hingedly connected with the covers and hingedly connected with the limiters or base flaps.

A further purpose is to provide auxiliary supports hingedly connected to the covers on edges adjoining the supporting edges of the limiters or base flaps and adapted to move toward the limiters when the limiters are in supporting position.

A further purpose is provide end flaps hingedly connected to the ends of the supports and to the front flaps.

A further purpose is to provide auxiliary supports hingedly connected to diagonal edges of the covers, and end flaps hingedly connected to the edges of the supports opposite from the hinge connection between the supports, and hingedly connected to the auxiliary supports.

A further purpose is to provide supports each having two sets of supporting edges, and preferably also two sets of limiters hingedly connected to the supports, and to one another, and limiting the movement of the structure, and preferably also two sets of tie flaps hingedly connected to the limiters.

Further purposes appear in the specification and in the claims.

In the drawings I have chosen to illustrate a few of the many possible embodiments of the invention, choosing the forms shown from the standpoints of convenience in illustration, satisfactory operation and clear demonstration of certain of the principles involved.

Figures 1 to 6 illustrate one embodiment.

Figure 1 is a side elevation of my article support in closed position.

Figure 2 is a section of Figure 1 on the line 2—2.

Figure 3 is a section of Figure 1 on the line 3—3.

Figure 4 is an enlarged fragment of Figure 3.

Figure 5 is a rearward perspective of my article support in open position.

Figure 6 is a front perspective of my preferred article support.

Figures 7 to 12 inclusive illustrate a variation in which the supports lie against outsides of the covers in closed position.

Figure 7 is a perspective showing the article support substantially closed.

Figure 8 is a front perspective showing the article support open.

Figure 9 is a rear perspective in open position.

Figure 10 is a bottom plan view in open position.

Figure 11 is a vertical section in open position taken upon the line 11—11 of Figure 8.

Figure 12 is a fragmentary section along the line 12—12 in Figure 11.

Figures 13 to 17 inclusive illustrate a form including limiters and auxiliary supports not connected with the limiters.

Figure 13 is a perspective showing the article support closed.

Figure 14 is a front perspective in open position.

Figure 15 is a rear perspective in open position.

Figure 16 is a section of Figure 14 on the line 16—16.

Figure 17 is a section of Figure 14 on the line 17—17.

Figures 18 to 26 inclusive illustrate an article support provided with limiters and tie flaps.

Figure 18 is a perspective in closed position.

Figure 19 is a front perspective in open position.

Figure 20 is a rear perspective in open position.

Figure 21 is a bottom plan view in open position.

Figure 22 is a section of Figure 20 on the line 22—22.

Figure 23 is a section of Figure 20 on the line 23—23.

Figure 24 is a section of Figure 20 on the line 24—24.

Figures 25 and 26 are fragmentary sections of Figure 21 on the lines 25—25 and 26—26 respectively.

Figures 27 to 32 inclusive illustrate a form of my invention having a separator between the cover hinges and between the support hinges.

Figure 27 is a perspective showing this form in closed position.

Figure 28 is a front perspective in open position.

Figure 29 is a rear perspective in open position.

Figure 30 is a fragmentary bottom plan view in open position.

Figure 31 is a section on the line 31—31 of Figure 29.

Figure 32 is a section on the line 32—32 of Figure 29, omitting the book structure.

Figures 33 to 36 inclusive illustrate a preferred article support according to the invention in which the supporting edges of the supports and the hinge conenctions between the supports and the covers actually intersect on the article support.

Figure 33 is a perspective in closed position.

Figure 34 is a front perspective in open position.

Figure 35 is a rear perspective in open position.

Figure 36 is a section on the line 36—36 of Figure 34.

Figures 37 to 41 inclusive illustrate a form of the invention in which the supports have double supporting edges.

Figure 37 is a fragmentary perspective in closed position.

Figure 38 is a front perspective in open position.

Figure 39 is a rearward perspective in open position.

Figure 40 is a rear elevation in open position with the covers raised into a vertical plane, instead of inclined as normally would be the case in service.

Figure 41 is a section of Figure 38 on the line 41—41.

Figures 42 to 48 inclusive illustrate a form of the invention in which the supports have double supporting edges, and double limiters and tie flaps are provided.

Figure 42 is a perspective in closed position.

Figure 43 is a front perspective in open position.

Figure 44 is a rear perspective in open position.

Figure 45 is a bottom plan view in open supporting position.

Figure 46 is a fragmentary rear elevation in open position with the covers brought into vertical planes.

Figure 47 is a section on the line 47—47 of Figure 44.

Figure 48 is a section on the line 48—48 of Figure 44.

Figures 49 to 52 inclusive illustrate a form of the invention in which the supporting edge and the hinge connection of each support to the cover are in parallel relations.

Figure 49 is a front perspective in open position.

Figure 50 is a rear perspective in open position.

Figure 51 is a bottom plan view in open position.

Figure 52 is a section on the line 52—52 of Figure 49.

Figures 53 to 58 inclusive illustrate the article support of my invention applied to a phonograph record album.

Figure 53 is a perspective view in closed position.

Figure 54 is a front perspective in open position.

Figure 55 is a rear perspective in open position.

Figure 56 is a fragmentary bottom plan view in open position.

Figure 57 is a section on the line 57—57 of Figure 55.

Figure 58 is a section on the line 58—58 of Figure 55.

Figures 59 to 66 inclusive illustrate an embodiment employing the parallel relationship between the supporting edge of the support and the hinge between the support and the cover, with positioning of this hinge below the tops of the covers.

Figure 59 is a perspective in closed position.

Figure 60 is a front perspective in open position.

Figure 61 is a rear perspective in open position.

Figure 62 is an enlarged section on the line 62—62 of Figure 59.

Figure 63 is an enlarged fragmentary section on the line 63—63 of Figure 59.

Figure 64 is a section on the line 64—64 of Figure 60.

Figure 65 is a section on the line 65—65 of Figure 60.

Figure 66 is a fragmentary reduced sectional plan on the line 66—66 of Figure 65 illustrating the tie flaps.

Figures 67 to 71 inclusive illustrate an article support according to my invention including auxiliary supports and end flaps.

Figure 67 is a perspective in closed position.

Figure 68 is a front perspective in open position.

Figure 69 is a rear perspective in open position.

Figure 70 is a section on the line 70—70 of Figure 68.

Figure 71 is a fragmentary section on the line 71—71 of Figure 70.

Figures 72 to 78 inclusive illustrate a form of the invention having auxiliary supports and end flaps, but in which the supporting edges of the supports are parallel to the hinge lines between the supports and the covers.

Figure 72 is a perspective in closed position.

Figure 73 is a front perspective in open position.

Figure 74 is a rear perspective in open position.

Figure 75 is a bottom plan view in open position.

Figure 76 is a section of Figure 73 on the line 76—76.

Figure 77 is a section of Figure 73 on the line 77—77.

Figure 78 is a section of Figure 76 on the line 78—78.

In the drawings like numerals refer to like parts.

Describing in illustration but not in limitation and referring to the drawings:

The present invention relates to article supports which may or may not be part of the article supported. Where they are separated from the article supported, they will commonly be designated as easels, holders, supports, racks or the like. Where it is designed to combine them with the articles supported, they may form parts of books, including albums such as phonograph record albums, loose-leaf binders, or books of the conventional library type, as well as portfolios, desk secretaries, visible file cards, greeting cards, salesmen's displays and catalogs, advertising displays, article sales racks, and the like.

In the prior art practice, non-folding supports have been used, as well as folding or adjusting supports attached to an article or separate therefrom, which require separate manipulation of flaps, tongues, clamps or the like to set and adjust the supporting members. Provision has also been made in the prior art for supporting members which are non-positive, depending for their function upon dropping under the action of gravity or the like into supporting position.

In accordance with the present invention, supports are provided which open and close in response to the movement of the covers, and in opening erect automatically and positively into supporting position without the necessity of separate manipulation other than the movement of the covers.

Where parts are functionally the same but differ somewhat in form, superscript numerals are being applied to the reference characters to distinguish the details of the various forms.

Considering the preferred form of Figures 1 to 6 inclusive, the article support comprises operators or covers 100 and 101, of any suitable material, preferably of sheet form, though permissibly skeletonized in any suitable way so that only operating elements and connections remain. The preferred material in most cases will be cardboard or plastic, although metal, stiff fabric, leather, wire or other suitable materials may be used.

While the operators or covers 100 may be the covers of a book or the supporting members of an easel as elsewhere explained, in this form it is contemplated that they will be card members. On their surfaces 102, which are interior surfaces in closed position and made visible in open position (Figure 6), they carry a suitable message or information, such as a greeting in the case of a greeting card, a record in the case of a visible index card, or a photograph or illustration in the case of a photograph mounting, novelty or the like. The covers may also permissibly carry a message or information on their outsides at 103, best seen in the folded position.

The edges 104 of the covers which adjoin in open position are connected to a hinge 105 extending for a substantial distance along the line 106. The hinge may be constructed in any suitable way, whether by means of a score line on a sheet, a fabric hinge or a mechanical hinge, but I have shown in this form a fabric hinge 110 preferably lying in the plane of the surfaces 102 in full open position (Figure 6) spuitably reinforced by a fabric hinge back 111 having sufficient slack at the hinge to permit folding of the structure into closed position, as shown in Figure 1. The hinge may if desired include means for limiting the opening of the hinge as well known in the hinge art, as by the tightness of the hinge 110 and the angular relationship between the abutting edges. In the various other forms, I will general not describe the hinge structure in detail in view of the fact that the contruction of hinges to permit the movements shown is within the skill of the designer.

The upper edges 112 of the covers and the outer edges 113 may preferably be rectangular as shown, but the lower edges 114 of the covers in this form are shaped on a diagonal, in effect at an obtuse angle to the line 106 of the cover hinge.

Supports 115 and 116 are provided, suitably in this form from the same sheet material as the covers, and preferably each integral with one of the covers and outwardly hingedly connected thereto by a score line at 114. The supports are hingedly connected at 120 to the covers, in this form to the lower edges of the covers.

The lower supporting edges 121 of the supports desirably converge with respect to the hinge lines 120, in this case intersecting at an apex 122 which may or may not be within the limits of the structure.

As seen in Figure 1, the supporting edges 121 may conveniently be parallel with the top edges 112 of the covers, though this may not always be the case.

Besides being hinged to the covers, the supports are hinged to one another along a line which for a part of its length is substantially spaced from the line of the cover hinge, preferably on a diagonal which diverges from the line 106 of the cover hinge. This is accomplished by providing an extension 123 of the supports at the back and joining them along a hinge line 124 which makes, with the cover hinge line 106 extended, an acute angle 125 in closed position. The hinge at 124 may again be of any suitable type provided there is freedom to operate outwardly. In this form the hinge consists of fabric 126 which may be tightly drawn on the inside and fabric 130 with suitable freedom on the outside.

As the covers 100 and 101 open, the angle 125 of divergence between the hinge line between the supports, and the cover hinge line, increases until as seen at 131, the angle of divergence, although still an acute angle, is quite wide.

In operation, when the covers are closed, the supports will also be closed and will preferably each lie in the plane of the corresponding cover as shown in Figures 1 to 3 inclusive.

As the covers are grasped and opened, the supports are automatically and positively erected to the supporting position as shown in Figures 5 and 6 by lever action exerted between the supports and the covers. Of course, it will be evident that in order to provide support, the center of gravity of the structure including any book or other object resting on the covers 100 and 101 must be above the area of support formed by joining the points 122, 122' and 132 resting on the supporting surface.

It will be evident of course that in the open position the supports lie in planes diverging markedly from the covers, whereas in the closed position they lie in the planes of the covers, or, generally stated, in planes adjacent thereto.

In order to consider action of the lever elements in the covers and the supports, a point 133 (Figure 1) has been marked on a cover 100 and points 134 and 135 have been marked on the support 115, all at the same distances from the edge 113 of the cover. When the cover is opened the lever element by which the cover acts at the point 133 in cooperation with the hinge 105 is the line 136, perpendicular to the hinge, while the lever element on which the point 134 acts in cooperation with the hinge 124 is the line 140, and the lever element on which the point 135 acts in cooperation with the hinge 124 is the lever element 141.

Since the lever element 140 is longer than the lever element 136, there will be greater throw of the supports in their outer movement than of the covers. Also since the lever element of the point 135 farther from the hinge 120 between the support and the cover is longer than the lever element of the point 134 (141 is longer than 140), each lever element of the innumerable such elements making up the support is more effective as its distance from the hinge line 120 increases. While this is being described in connection with the form now under discussion, the same characteristic is exhibited by numerous other forms later described, and no effort will be made to repeat this discussion in case of each of these separate forms.

An important characteristic of this form of the invention which is true of many other forms, but not of all forms, is the convergence between the supporting edge 121 and the hinge 120 on each support.

In the present construction the opening movement is limited merely by the structure of the cover hinge, which in the present form imposes restraint when the covers have opened the desired amount.

In the form of Figures 1 to 6 inclusive, the supports not only lie in planes adjacent to the planes of the covers when the structure is closed, but also actually lie in the same planes as the covers. In the form of Figures 7 to 12 inclusive, like several other forms, the supports 115' and 116' in closed position lie in planes adjacent to the planes of the covers 100' and 101' but not in the same planes.

In this form the article support is intended as a holder employing the covers 100' and 101' in open position as best seen in Figures 8 and 9, to support or hold a book, photograph, music or the like separate from the support structure.

The covers and their hinges are desirably substantially identical with those shown in Figures 1 to 6 inclusive, except that extra sheets 142, suitably forming parts of the covers, are fastened thereto at 143 so as to extend over the outsides, but are diagonally sloped at 144 conforming to the sloping hinge line 120 between the supports 115' and 116' and the covers 100' and 101'. For convenience the supports may be integral with the extra sheets 142, and the hinge line 120 may be a score line if desired. The hinge line 124 between the supports is well spaced over most of its length from the cover hinge line 106 and preferably diverges from the hinge line 106 at an acute angle 125 as in the earlier form, and the divergence increases as the covers open and the supports are automatically and positively erected to the supporting position.

A feature of this form differing from that of Figures 1 to 6 is that in the form of Figures 7 to 12, the lower edges of the covers at 145 are preferably square and parallel to the upper edges 112 and contact the supporting surface, so that there is contact with the supporting surface along the supporting edges 121 of the supports and also along the lower edges of the covers.

When the covers open into a substantially straight line as shown at 146 (Figure 10), it will be evident that the supporting members consisting of the two covers and the two supports form substantially a triangular pyramidal support, of which each support forms one side, and the two covers in substantially the same plane form the other side. This structure is very stable and supports the device firmly provided the center of gravity of the structure and the article supported on it lies above some point within the triangle 147, 148 and 149 formed by the supporting edges and the covers in line. Even though the covers are not opened far enough to fall fully in line, they approach this triangular pyramidal supporting condition.

Thus it will be seen that in closed position one support and one cover lie against one another in a pair, and in open position the covers tend to come into line in a pair and the supports open positively and automatically as two other sides of the triangular pyramidal support as shown. It will be evident that the structure may not comprise a full pyramid, as it may be truncated or otherwise sectioned.

It will also be evident that if we pass through the structure a plane perpendicular to the cover hinge, the distance from a point 150 on the hinge line 120 between a support and the corresponding cover, to the hinge line 124 between the supports in this plane perpendicular to the cover hinge will be greater as indicated by the line 151 than the corresponding distance from a point 152 on the cover immediately below the point 150 to the cover hinge as indicated by the line 153. Also the leverage of the support increases from a very small amount at a point 154, where the hinge between the supports is close to the cover hinge, to a very considerable amount at a point 155 where the hinge between the supports is far from the cover hinge. If, instead of measuring the leverage in a plane perpendicular to the cover hinge, it be measured as projected distance to the corresponding hinge in each case, it will be seen that the line 156 from the point 150 on the hinge connection between the support and the cover in Figure 7, to the hinge between the supports and perpendicular thereto is substantially longer than the line 153 indicating the leverage at that position on the cover. Correspondingly as one moves from the position 154 toward the position 155 the leverage represented by projected distances from the hinge connection between the support and the cover, to the hinge connection between the supports increases.

It will thus readily be evident why the supports diverge as shown in Figures 8 to 11 inclusive from the planes of the covers as the covers open.

It will be evident that while, in many of the forms, sheet material is shown, the material may be skeletonized as indicated by the dotted line 157 in Figure 7, cutting away the center 158, to leave only ribs, bars or wires as shown at the hinges and supporting edges.

In case the holder is intended to form a box for the article in closed position, it may be provided with edge walls 159 (Figure 9) extending around the outer edges of the covers, and suitably meeting or interlocking in closed position.

It will be evident that while, in the form of Figures 1 to 6, the supporting edges of the supports were parallel to the top edges of the covers in closed position, in the form of Figures 7 to 12 the supporting edges are sharply diagonal with respect to the tops of the covers in closed position as best seen at 160 in Figure 7. This angle is within control of the designer. It will also be noted that the supporting edges 121 converge with respect to the hinge connection 120 between the supports and the covers, but that the structure is shortened at 161 before an actual intersection occurs.

In the form of Figures 13 to 17 inclusive I illustrate limiters or base flaps and auxiliary supports or front flaps, with convergence between the supporting edges of the supports and the hinge lines between the supports and the covers.

The operators or covers 100² and 101² may be essentially as previously shown, desirably with auxiliary supports 162 diagonally hinged to the bottom edges of the covers at 163, capable of being bent outward as shown in Figure 14 in open position (see also Figure 17), but not in this form connected to the supports. In open position the lower extremity of the juncture between the covers may be in supporting engagement with a supporting surface at 164.

The supports 115² and 116² are essentially as shown in the form of Figures 7 to 12 inclusive except that they are shortened at 165 relatively far from the intersection between the converging supporting edges 121 and the hinge lines 120 between the supports of the covers. As in the other forms, the hinge line 124 between the supports is widely spaced from the cover hinge line 106 over a considerable part of its length and preferably diverges from the cover hinge line in closed position, and is further spaced and diverges more markedly as the covers open and the supports are positively erected.

Instead of terminating the supports at the supporting edges 121 as in the earlier described forms, hinge lines 166 are provided along the supporting edges for connection to limiters 170 which are hingedly connected to one another at 171.

As seen in Figure 13, it will be evident that the hinge line 124 between the supports diverges from the hinge line 106 between the covers at an acute angle, but the hinge line 171 between the limiters diverges from the hinge line 106 between the covers at an opposite acute angle, producing a reverse bend or hump 172 in the back of the structure in closed position.

When the structure is in erected position, the limiters 170 lie in the same plane connected by their hinge line as indicated in Figures 14 and 16, and the angle of the limiters and the hinge between the limiters determines the extent of opening of the supports on their hinge 124 and provides a definite limit to the opening of the entire structure. This will be evident in Figures 14 and 15, where it is shown that in the particular design the limit is set at about 150° opening of the covers. This may be particularly desirable in the case of mounting of certain types of salesmen's samples or objects for sale on the insides of the covers, where the width in open position may be a limiting factor.

It will be evident that the two supports and the two limiters in open position in effect form a triangular pyramid of support, the two limiters in one plane forming one side, and the supports forming the other two sides. The apex of this pyramid is at 173. These members are interconnected along four hinge lines and in compact or flattened position they lie in substantially parallel planes, while in open position the two limiters which were formerly in parallel planes move into substantially the same plane.

In the form of Figures 18 to 26 inclusive, I provide both limiters and tie flaps. As indicated in Figure 20, this structure is applied as a book supporting easel, on which a book 174 rests (Figure 20).

Covers 100³ and 101³ and their hinge line 106 are essentially as in the other forms, except that the lower edges are diagonally formed at 175 to provide contacting surfaces to assist in holding the article support at the selected angle, and to assist in hinging the tie flaps later described.

The supports 115³ and 116³ may be essentially as shown in the form of Figures 13 to 17 inclusive except that in closed position the hinge line 124 is shown more sharply divergent from the cover hinge line 106. The limiters 170' may also be similar to those shown in Figures 13 to 17, except that the structure is shortened at 176 so that the hinge line 166 between the limiters and the supports does not intersect the lower edge 180 (in closed position) of the limiters, as it does at 181 in Figures 13 to 17. Also the hinge line 171 between the limiters more sharply diverges from the cover hinge line in this form than in the form of Figures 13 to 17 inclusive.

Along the edges 180 of the limiters I provide hinge lines 182 to tie flaps 183, the opposite edges of which are hinged at 184 to the lower edges of the covers along the diagonal lines 175. The tie flaps may in some cases be hinged together at 185 as shown in this form.

As best shown in Figures 25 and 26, under the spring of the sheet material, each limiter and its adjoining tie flap in opening springs slightly beyond the coplanar position as indicated at 186, while each limiter with respect to its adjoining limiter and each tie flap with respect to its adjoining tie flap also springs slightly beyond the coplaner position, creating a locking action similar to a toggle action. This action may be accomplished automatically if at the time the covers are opened the structure is placed down quickly on a supporting surface which will push the limiters and tie flaps into snap locking position as shown.

To create the snap locking, instead of using the supporting surface, a vigorous opening action and slight flexing of the covers at the limiting position of opening is sufficient. To close it is sufficient to apply closing leverage on the covers, which unsets the snap locking in the case of a cardboard or other slightly resilient structure.

An important feature which should be noticed in the form of Figures 18 to 26 is that the hinge line 120 between the cover and the support, the hinge line 166 between the support and the limiter, the hinge line 182 between the limiter and the tie flap and the hinge line 184 between the tie flap and the cover all converge and would actually intersect if the structure was not shortened at 176. This feature is important where parallelism is not employed, as later set forth.

It will be evident that in this structure the same characteristics are to be found regarding longer leverage in the support than in the cover, and pyramidal support both by cooperation between the supports and the cover, and by cooperation between the supports and the limiters, along with the tie flaps.

In the form of Figures 18 to 26 a separate book is shown resting on the article support. In the form of Figures 27 to 32 inclusive, the article support is part of the binding of the book 190, the covers forming the covers of the book.

This structure differs slightly from the other structures shown in that the cover hinge 105 between corners 100⁴ and 101⁴ is a double hinge as normally employed in book binding, the hinge between the supports 115⁴ and 116⁴ is a double hinge consisting of two hinges 124 and a hinge separator 191, and the hinge between the limiters 170² is a double hinge consisting of hinges 171 and a separator 192. As will be evident in Figure 27, when the book is closed the hinge separators form the library back of the book, on which suitable notation of title, author, or the like would appear at 193. The contour of the library back is substantially the same as the contour seen in Figure 18, with the hinge line 124 between the supports and the hinge line 171 between the limiters both spaced over most of their lengths from and diverging from the hinge line 106 between the covers at opposite acute angles.

In this form the hinge between one tie flap and the other has been omitted at 194 and the limiters and tie flaps are not snapped into locking position as in the form of Figures 18 to 26 inclusive. The tie flaps 183′ function as auxiliary supports in this form, but are erect as shown in Figure 32 rather than horizontal in open position. In all other respects this structure is identical with that of Figures 18 to 26 inclusive.

One purpose including separators in this form is to indicate that spacers or separators may be used between similar members in all forms.

In Figures 33 to 36 inclusive I illustrate an article support which forms part of a loose leaf binder or salesman's catalog 195 having any suitable binder rings 196 at the hinge line 106 between covers 100⁵ and 101⁵.

This structure differs from that of Figures 18 to 26 and 27 to 32, respectively inclusive, in that the various hinge lines actually meet in an apex 200, in which the hinge line 120 between the support and the cover, the hinge line 166 between the support and the limiter, the hinge line 182 between the limiter 170³ and the tie flap 183², and the hinge line 184 between the tie flap and cover actually intersect in both open and closed position. Actually this apex is not at the outer edge 113 of the cover (see Figure 33), and it need not be located at any particular point with respect to the edges of the cover, as long as the various hinge lines can operate freely.

This form of the invention is a double form as in Figures 27 to 32 inclusive, and in other respects it may be identical with Figures 27 to 32.

It will be evident in this form, as is also true in the form of Figures 27 to 32 inclusive, as well as other forms, that the supports, limiters, tie flaps and covers in open position form a pyramid of support on either side of the cover hinge, of which the supports and covers each form one side, and the limiters and tie flaps substantially in one plane form the other side. In the form of Figures 33 to 36 inclusive the apex of each such pyramid is at 200 and in the form of Figures 27 to 32 inclusive this pyramid is truncated, the apex being located in prolongation of the converging sides.

In Figures 37 to 41 inclusive I illustrate a variant of the invention, suitably an index card, having hinged covers 100⁶ and 101⁶ as described elsewhere, but with a different type of support and hinged connection of the supports. In this form the supports 115⁶ and 116⁶, instead of being hinged to the covers along lines intersecting the cover hinge, are hinged along lines 201 which are suitably parallel to the cover hinge line 106, and spaced intermediate between the cover hinge and the outer edges 113 of the covers.

The supports still preserve the longer lever arms as well shown in Figures 37 and 39, their hinge connection from one to the other at 124 being parallel to the cover hinge as indicated at 202.

The upper and lower edges of the supports at 121 are preferably both cut diagonally to provide angular support for the covers either in upright or inverted position. This is very convenient especially with a file card which may be grasped in a position making it most convenient to erect either way for reading from an angle. The contact of the supporting surface with the cover at 164 supplements the support from the supports.

In Figures 42 to 48 inclusive, the structure shown in Figures 37 to 41 inclusive is modified to include limiters and tie flaps, and to carry the hinge 120 to the outer edges of the covers as shown at 203. The covers 100⁷ and 101⁷ at both top and bottom edges are diagonally sloped from the outer edges 113 to the hinge lines at 106 as shown at 204. The supports 115⁷, 116⁷ have their supporting edges 121 formed so sharply diagonal both top and bottom that the support hinge line 124 is simply an apex as shown at 205 and the supports can in this form properly derive their hinge connection partially or wholly through the limiter hinge connection to one another. The limiters 170⁴ are hingedly connected to the supports at 166 both top and bottom and hingedly connected to one another at 171 on both the top and the bottom. As in other forms the limiters limit the opening movement of the structure.

Tie flaps 183³ both top and bottom are hingedly connected to the limiters at 182 and hingedly connected to the covers at 184 both top and bottom in each case.

For convenience in holding the relation between the respectively opposite pairs of limiters and tie flaps in open position, I will preferably connect a strip of elastic 206 such as a rubber band between opposite points 210 and 211 on the ends of the limiters nearest to the cover along the hinge line between the limiters. This tends to hold the structure firm in the position seen in Figures 47 and 48. In closed position the structure may if desired be clasped shut by any suitable means.

It should be noted that this structure is capable of being inverted and will provide adequate inclined support when resting on either set of limiters, the angles of the supporting edges at the top and bottom being varied by the designer to provide the same or different inclination as desired.

It should be noted that in the form of Figures 42 to 48 inclusive at the apex 212 adjoining the top and bottom outer edges of the covers, the hinge lines of the cover to the support, of the support to the limiter, of the limiters to the tie flap and of the tie flap to the cover all converge, while at the apex 205 a total of six hinge lines converge, four of them being hinge lines between the supports and the limiters, and two being hinge lines between limiters.

It will be evident also that in both open and closed position the hinge connection between the supports is relatively far behind the hinge connection between the covers and moves further away from the hinge connection between the covers as the structure opens. This is true whether the hinge connection between the supports is a very narrow one as at 205 in Figure 42, or of substantial length as at 202 in Figures 37 to 41 inclusive. This characteristic suffices to provide longer lever elements operating in the supports than the lever elements operating in the covers, which positively erect the structure as described in reference to the earlier forms.

In all previous forms shown, the hinge lines between the supports and the covers, and the supporting edges of the supports, converge. In the forms now to be described, a parallel relationship exists.

Referring to Figures 49 to 52 inclusive, the covers 100⁸ and 101⁸ may be of usual rectangular form, but as shown are comparatively short in vertical dimension so that the combined supports 115⁸ and 116⁸ and base flaps 170⁵ in closed position (similar to Figure 53) extend down well below the covers.

It will be noted that the hinge lines 120 between the supports and the covers, while slightly angular with respect to the top edges of the covers, are parallel with respect to the supporting edges 121 of the supports, which form the hinge line 166 with the limiters.

The limiters are hinged together at 171 as in other forms and except that the hinge lines 120 and supporting edges 121 are parallel rather than converging, this structure may be regarded as being a variation of that of Figures 13 to 17 inclusive. However, while in the form of Figures 13 to 17 inclusive the size of the limiters or base flaps permits only negligible extension of the base flaps beyond the lower edges of the covers, in the form of Figures 49 to 52 inclusive the base flaps are large enough to provide any desired extension below the edges 213 of the short covers in closed position.

The form of Figures 53 to 58 inclusive differs from that of Figures 49 to 52 inclusive particularly because in the former I provide double rather than single hinges, and apply the device to an album for holding articles such as phonograph records 216 mounted in any suitable record holding envelope type leaves 220 mounted on any suitable individual hinges of the type commonly employed in phonograph record albums. The covers 100⁹, 101⁹ hinged along the line 106 are suitably cut off diagonally at 175 at their lower edges to rest conveniently on a supporting surface. The supports 115⁹, 116⁹ exhibit parallelism between the hinge lines 120 from the covers to the supports, and the supporting edges 121. At the outer end of the supporting edges 121 the supports are conveniently cut off at an angle at 222 to make a square bottom edge in closed position.

At the hinge 124 between the supports 115⁹ and 116⁹ I provide a hinge spacer 223 which may be substantially of the same character as that previously described in reference to the converging form. Limiters 170⁶ are hinged at 166 to the supporting edges of the supports and are hingedly connected at 171 to one another across a hinge spacer 224. The hinge spacers are preferably hingedly connected to one another at 166'.

It will be evident that, as in other forms, this structure erects positively, the most convenient manner of accomplishing the result being to rest the hinge spacer 224 on a supporting surface, and then open the covers, the limiters 170⁶ moving into the same plane as the hinge spacer 224, while the supports erect into supporting position as in the other forms, until limited by the angle of the limiters 170⁶ connected by the hinge 171.

It will be evident that in closed position as in forms earlier described the hinges 124 and 171 respectively between the supports and between the limiters are each at acute angles with respect to the cover hinge 106, although opposite to one another. Also as in other forms the supports have longer lever elements than the covers and the bulk of the hinge between the supports is well spaced from the cover hinge in closed position, and still further spaced therefrom in open position.

It will be evident that in this form the covers are designed to open somewhat less than 180°, suitably about 120°. It will also be evident that the choice as to whether the lower corner of the book should be cut diagonally at 175 is largely a matter of design in selection of the lengths of the covers, supports and limiters.

In Figures 59 to 66 inclusive I illustrate a form somewhat similar to that of Figures 53 to 58 inclusive, but differing therefrom to indicate that where the hinge lines between the supports and the cover are parallel to the supporting edges of the supports, the hinge lines between the supports and the covers need not intersect the upper edges of the covers, and that tie flaps may be used which are not hinged on the edges of the limiters. This form also opens less than 180° as shown.

The lower edges of the covers 100¹⁰ and 101¹⁰ are diagonally cut at 175. The hinge lines 120 between the supports $115^{10}$ and $116^{10}$ and the covers are parallel to the supporting edges 121 of the supports and intersect the cover hinge line 106 at 225 below the top of the book or other article support.

The hinge line 124 between the supports diverges from the cover hinge line in both open and closed position as in the other forms. Limiters $170^7$ are hingedly connected to the supports at 166 and hingedly connected to one another at 171. Tie flaps $183^4$ (best seen in Figure 66) are hingedly connected to the limiters at 226 along a line which does not conform with the edge 230 of the limiters and are hingedly connected to the covers at 184 along the line 175.

It should be noted that in this form, parallelism exists among the lines of hinges between a cover and the corresponding support, the support and the limiter, the limiter and the tie flap, and the tie flap and the cover, both in open and closed position. The hinge lines between the supports, between each support and the limiters and between the two limiters converge into an apex 231, which in open position is the apex of a pyramid of support, two sides of which are formed by the two supports and the third side by the two limiters lying in substantially the same plane.

The form of Figures 67 to 71 inclusive differs from the forms previously discussed in that end flaps are provided between the supports and the covers. Covers $100^{11}$ and $101^{11}$ are hinged together at 105, and have sharply diagonal lower edges 232 extending all the way to the upper edges.

The supports $115^{11}$ and $116^{11}$ are hingedly connected to the covers at 120 on the top edges of the covers 112, and hingedly connected to one another at 124 at an angle diverging from the hinge between the covers in both open and closed positions.

Limiters $170^8$ are hingedly connected to the supports $115^{11}$ and $116^{11}$ at 166 as in the other forms and are hingedly connected together at 171 at an angle which diverges from the angle of the cover hinge oppositely from the divergence of the hinge 124.

Secured to the diagonal edges 232 of the covers on hinge lines 233 are auxiliary supports 234, which are hingedly connected at their outer edges 235 to end flaps 236, which in turn are hingedly connected at 237 to the outer edges of the supports $115^{11}$ and $116^{11}$.

In this form it will be noted that the hinge lines between the covers and the supports converge with respect to the supporting edges of the supports. The hinge lines between each cover and the support, between the support and the end flap, between the end flap and the auxiliary support and between the auxiliary support and the cover intersect in an apex 236 on each side of the structure.

To provide proper support on the bottom of the end flaps, these have been cut at 240 in prolongation of the hinge line 166 in closed position.

In this form a double hinge is used, having a hinge separator 223 extending from end to end of the hinge 124, and a hinge separator 224 in the hinge 171. A single cover hinge 105 is however employed.

In the form of Figures 67 to 71 inclusive, I apply auxiliary supports and end flaps to a structure in which the hinge lines between the supports and the covers are converging with respect to the supporting edges of the supports. In Figures 72 to 78 inclusive, the invention is illustrated applied to a form in which the hinge line 120 between the covers and the supports $115^{12}$ and $116^{12}$ is parallel to the supporting edges 121 of the supports. As in the form just described, the covers $100^{12}$ and $101^{12}$, which may be used for example to support a book 174, have diagonal lower edges 232 hingedly connected at 233 to auxiliary supports 234. The supports $115^{12}$ and $116^{12}$ hinge together at 124 along a line which diverges from the cover hinge line 106, and are hingedly connected at 237 to end flaps 236 hinged at 235 to the outer edges of the auxiliary supports 234. The limiters $170^9$ may be suitably identical with the form of Figures 67 to 71 inclusive.

It will be evident that this form is limited by the angularity of the hinge line 171 of the limiters to an opening of somewhat less than 180°, suitably of the order of 150°.

In both this and the last previous form, assistance in the opening movement is obtained by resting the hinge line 171 of the limiters on a supporting structure at the same time that the covers are opened.

In this form it will be evident that the apex 236, at which the hinge lines between a cover and the corresponding support, between the support and the corresponding end flap, between the end flap and the corresponding auxiliary support and between the auxiliary support and the cover converge, is not located at the upper corner as in the form of Figures 68 to 71, but is located somewhat down one side below the upper corner.

It will be evident that in all of the forms shown the common feature exists that the hinge connection between the supports to operate the supports is located over at least part of its length at some distance from the hinge connection between the covers in closed position, preferably diverging therefrom, and that at least a portion of the hinge connection between the supports moves away from and preferably further diverges from the hinge connection between the covers with opening movement, thus contributing to the feature of longer leverage for opening movement in the hinge supports than in the covers, which causes the hinge supports to move outward with respect to the covers.

It will further be evident that throughout the various forms pyramidal support is provided, preferably moving two sides which form a flat structure in closed position into a substantially common plane to make one side of a three-sided pyramid in open position, and that this feature of pyramidal support in the various forms is applied variantly at different apexes, sometimes to the support and the covers and elsewhere to the support with the limiters or other supporting elements.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention what I claim as new and desire to secure by Letters Patent is:

1. In an article support, cooperating covers, a hinge connecting the covers and in open position upstanding from a supporting surface, supports having supporting edges hingedly connected to the covers and hingedly connected to one another and over a substantial length of the hinge connection between one support and the other substantially spaced from and behind the cover hinge in closed position and further spaced therefrom in open position, the relationship among the hinge lines and supporting edges including angles other than right angles, and the mutual hinge of the supports being upstanding from and inclined with respect to the surface in open position.

2. In an article support, hinged covers, supports outwardly hingedly connected to the covers having a position substantially flat with respect to the covers and a position diverging therefrom, in combination with positive means for erecting the supports by opening or closing the covers including a hinge connection between the supports which diverges from the line of the cover hinge in all positions, and which is upstanding from a supporting surface in open position.

3. In an article support, opposite covers, a hinge connecting the opposite covers and in open position upstanding from and inclined to a supporting surface, supports in closed position lying adjacent the planes of the covers, hinges connecting the supports to the covers and permitting outward swinging of the covers, and a hinge connecting the supports with one another, substantially spaced over a part of its length from the line of the cover hinge when the covers are closed and further spaced from the line of the cover hinge when the covers are open to place the supports positively in supporting position, the relationship of the hinge lines and supporting edges including angles other than right angles, the mutual hinge of the supports being upstanding from the supporting surface in open position.

4. In an article support, front and back covers, a cover hinge connecting the covers, supports of stiff sheet material hingedly connected to the covers and hingedly interconnected to one another at an acute angle with respect to the line of the cover hinge when the covers are closed and opening into supporting position in response to movement of the covers when the covers are open.

5. In an article support, front and back covers, a hinge connecting the covers, supports lying adjacent the planes of the covers in closed position and having supporting edges adapted to contact a supporting surface in open position, and the supports being outwardly hingedly connected to the covers and hingedly connected to one another along a line which diverges from the line of the hinge of the covers when the covers are closed and further diverges therefrom when the covers are open to support the structure at an angle.

6. In an article support, cooperating covers, supports outwardly hingedly connected with the covers, the supports being hingedly connected with the covers along a line which diverges from the line of the cover hinge in closed position and which further diverges as the covers open, and lies in substantially the planes of the covers in closed position of the covers, the supports having edges adapted to contact a support surface and each edge being parallel to the hinge line joining the support to the cover.

7. In an article support, front and back covers, a hinge interconnecting the covers, and supports lying adjacent the planes of the covers when the covers are closed, the supports being outwardly hingedly connected with the covers and hingedly connected to one another on a line which is substantially spaced over at least a part of its length from the line of the cover hinge when the covers are closed and further spaced as the covers open, the supporting edges of the supports converging with respect to the line of hinge connection between the supports and the covers at an angle other than a right angle.

8. In an article support, front and back covers, a hinge connecting the covers, supports lying adjacent the planes of the covers when the covers are closed, the supports being outwardly hingedly connected with the covers along lines making acute angles with the line of the cover hinge and hinged to one another on a line which diverges with respect to the line of the cover hinge when the covers are closed and further diverges as the covers open, and the base supporting line of the supports converging with respect to the line of hinge connection of the supports to the covers at an angle other than a right angle.

9. In an article support, a pair of operators, an operator-hinge separator hingedly connected to each of the operators, a pair of supports each hingedly connected to one of the operators, a support-hinge separator hingedly connected to each of the supports, a pair of limiters each hingedly connected to one of the supports and a limiter-hinge separator hingedly connected to each of the limiters.

10. In an article support, cooperating front and back covers, a hinge connecting the covers, supports resting adjacent the planes of the covers in closed position and having supporting edges adapted to rest on a supporting surface in open position, the supports being outwardly hingedly connected to the covers and hingedly connected together along a line which over part of its length is spaced from the cover hinge in closed position, the supporting edges converging with respect to the line of hinge connection between the supports and the covers at an angle less than a right angle, and means for limiting the opening movement of the supports.

11. An article having two hinged members, two supports mutually hinged together and hinged to the hinged members of the article and two limiters mutually hinged together and hinged to the supports, the supports and limiters in closed position forming with the article a compact structure and in open position erecting to place the supports in supporting position as restricted by the limiters.

12. In an article support, front and back covers, a hinge connecting the covers, supports lying adjacent the planes of the covers when the covers are closed and erecting positively to bring supporting edges into contact with a supporting surface when the covers are open, and the supports being outwardly hingedly connected to the covers and hingedly conneced to one another along a line which diverges from the line of the cover hinge when the covers are closed and further diverges as the covers open, and limiters hingedly connected to the supporting edges of the supports and hingedly connected to one another.

13. In an article support, front and back covers cut diagonally at their bottom edges, a hinge connecting the covers, supports lying adjacent the planes of the covers in closed position and having supporting edges adapted to contact a supporting surface in open position, the supports being outwardly hingedly connected to the covers and hingedly connected to one another along a line which diverges from the line of the cover hinge when the covers are closed and further diverges therefrom when the covers are open, in combination with limiters hingedly connected to the supporting edges of the supports and hingedly connected to one another, the supports and limiters cooperating with the diagonal shape of the bottoms of the covers to support the structure in angular position.

14. An article support according to claim 11 in which the supports have supporting edges adapted to contact a supporting surface in open position, and the supports are hinged to the hinged members of the article on lines parallel with the supporting edges.

15. In an article support, front and back covers, a hinge connecting the covers, supports lying adjacent the planes of the covers when the covers are in closed position, the supports being outwardly hingedly connected to the covers and hingedly connected to one another along a line which diverges from the line of the cover hinge when the covers are closed and further diverges when the covers are open, said supports having supporting edges adapted to engage a supporting surface, limiters hingedly connected to the supports along the supporting edges and hingedly connected to one another and tie flaps hingedly connected to the cover and hingedly connected to the limiters.

16. In an article support, a pair of cooperating covers, a hinge connecting the covers, supports hingedly connected to the covers and to one another, limiters hingedly connected to the supports and to one another, and tie flaps hingedly connected to the limiters and to the covers, the hinge lines between each cover and the corresponding support, between that support and the corresponding limiter, between that limiter and the corresponding tie flap and between that tie flap and the corresponding cover all converging toward an apex in open and closed operation.

17. In an article support, cooperating covers, a hinge connecting the covers, supports outwardly hingedly connected to the covers and to one another, limiters hingedly connected to the supports and to one another and tie flaps hingedly connected to the limiters and to the covers, the lines of hinge connection between each cover and the corresponding support, between the support and the corresponding limiter, between the limiter and the corresponding tie flap, and between the tie flap and the corresponding cover being parallel both in open and closed position, and the hinge lines between one support and the other support, between each support and the corresponding limiter and between one limiter and the other limiter, all converging toward an apex in open and closed position.

18. In an article support, cooperating covers, a cover hinge interconnecting the covers, and supports outwardly hingedly connected with the covers, the supports being hingedly connected with one another along a line which diverges from the line of the cover hinge in closed position and which further diverges as the covers open and lying in substantially the planes of the covers in closed position of the covers.

19. In an article support, front and back covers, a hinge connecting the covers, supports outwardly hingedly connected with the covers and hingedly connected with one another, the supports lying adjacent the planes of the covers in closed position and erecting positively into supporting position when the covers are opened, the supports each having two supporting edges, and two sets of limiters hingedly connected to the supporting edges and to one another, and limiting the opening movement of the structure.

20. In an article support, front and back covers, a hinge connecting the covers, supports outwardly hingedly connected with the covers and hingedly connected with one another and lying adjacent the planes of the covers in closed position and erecting positively into supporting position when the covers are opened, the supports each having two supporting edges, two sets of limiters hingedly connected to the supporting edges and to one another, and limiting the opening movement of the structure, and two sets of tie flaps hingedly connected to the limiters and to the covers.

21. An article support according to claim 1 in which the supports are outwardly hingedly connected to the covers along lines substantially parallel to the cover hinge.

22. An article support according to claim 1 in which the supports have top and bottom inclined supporting edges and are outwardly hingedly connected to the covers along lines substantially parallel to the cover hinge, the supporting edges being inclined to the mutual hinge connections of the supports.

23. In an article support or the like, a first pair of mutually hinged members, a second pair of mutually hinged members each of which is interhinged with a different one of the first pair of mutually hinged members, the mutual hinge lines of the respective pairs of members intersecting at an angle other than a right angle and the angle of intersection of the mutual hinges varying in proportion to the extent of relative motion of the members, and a pair of mutually hinged limiters each of which is interhinged with a different one of the members of one of the first and second pairs.

GLENN C. HENRY.

REFERENCES CITED

The following references are of record in the file of this patent:

UNITED STATES PATENTS

| Number | Name | Date |
|---|---|---|
| 527,096 | Wunder | Oct. 9, 1894 |
| 1,476,838 | Pratt | Dec. 11, 1923 |
| 1,687,875 | Meller | Oct. 16, 1928 |
| 2,178,903 | Cole | Nov. 7, 1939 |
| 2,407,592 | Wathen | Sept. 10, 1946 |
| 2,490,356 | Hummel | Dec. 6, 1949 |

FOREIGN PATENTS

| Number | Country | Date |
|---|---|---|
| 531,576 | Germany | Aug. 13, 1931 |